(12) United States Patent
Henocq et al.

(10) Patent No.: US 8,406,289 B2
(45) Date of Patent: Mar. 26, 2013

(54) METHOD AND DEVICE FOR SELECTING A TRANSCODING METHOD AMONG A SET OF TRANSCODING METHODS

(75) Inventors: Xavier Henocq, Acigne (FR); Lilian LaBelle, St. Samson sur Rance (FR)

(73) Assignee: Canon Kabushiki Kaisha, Tokyo (JP)

( * ) Notice: Subject to any disclaimer, the term of this patent is extended or adjusted under 35 U.S.C. 154(b) by 709 days.

(21) Appl. No.: 12/237,555

(22) Filed: Sep. 25, 2008

(65) Prior Publication Data

US 2009/0016433 A1   Jan. 15, 2009

Related U.S. Application Data

(62) Division of application No. 10/387,426, filed on Mar. 14, 2003, now Pat. No. 7,453,937.

(30) Foreign Application Priority Data

Mar. 14, 2002  (FR) ...................................... 02 03167

(51) Int. Cl.
   *H04N 7/12* (2006.01)
(52) U.S. Cl. ............................... 375/240.01; 375/240.12
(58) Field of Classification Search .................. 375/240, 375/240.01, 240.03, 240.12, 240.13
   See application file for complete search history.

(56) References Cited

U.S. PATENT DOCUMENTS

| | | | |
|---|---|---|---|
| 6,490,320 B1 | 12/2002 | Vetro et al. | 375/240.08 |
| 6,590,936 B1 * | 7/2003 | Kadono | 375/240.12 |
| 6,904,094 B1 * | 6/2005 | Liu et al. | 375/240.13 |
| 2002/0176629 A1 | 11/2002 | Labelle | 382/232 |

FOREIGN PATENT DOCUMENTS

| | | |
|---|---|---|
| EP | 1 089 568 A1 | 4/2001 |
| EP | 1 170 954 A1 | 1/2002 |

OTHER PUBLICATIONS

Kyeong Ho Yang et al.; "A Normalized Rate-distortion Model for H.263-Compatible Codecs and Its Application to Quantizer Selection"; Proc. of Int'l Conference on Image Processing (ICIP'97), Oct. 26-29, 1997, vol. II pp. 41-44, XP010254037.

Jordi Ribas-Corbera et al.; "Rate Control for Low-Delay Video Communications"; ITU Telecommunications Standardization Sector, Jun. 24, 1997, pp. 1-27, XP001100047.

Shinya Kadono et al.; "Rationality of Restricted Re-Quantization for Efficient MPEG Transcoding"; Proceedings 2000 Int'l Conference on Image Processing (ICIP '00), Proc. of $7^{th}$ IEEE Int'l Conference on Image Processing, Vancouver, BC, Canada, Sep. 10-13, 2000, pp. 952-955, vol. 1, XP010530774.

(Continued)

*Primary Examiner* — Allen Wong

(74) *Attorney, Agent, or Firm* — Fitzpatrick, Cella, Harper & Scinto

(57) ABSTRACT

Selecting a method from a set of methods of transcoding digital video data, the data being transferable between at least two communication apparatuses via a communication network, including, for each transcoding method, obtaining a distortion value from a mathematical model for establishing the distortion taking into account the transcoding method, the distortion model being applied to information representing the content of the signal represented by the digital data to be transcoded, and selecting a transcoding method as a function of the different distortion values obtained for the set of transcoding methods, the set of transcoding methods including at least two different types of transcoding methods, each type of transcoding method being selected from at least one of a plurality of methods of reducing a spatial resolution, a plurality of a re-quantization methods, and a plurality of methods of reducing a frame rate.

22 Claims, 8 Drawing Sheets

OTHER PUBLICATIONS

Gustavo de los Reyes et al.; "Error-Resilient Transcoding for Video over Wireless Channels"; IEEE Journal on Selected Areas in Communications, Jun. 2000, IEEE, USA, vol. 18, No. 6, pp. 1063-1074, XP002233788.

YongQing Liang et al; "A New Content-Based Hybrid Video Transcoding Method"; Proc. of 2001 Int'l Conference on Image Processing (ICIP '01), Oct. 7-10, 2001, vol. 1 of 3, Conf. 8, pp. 429-432, XP010564888.

J. Smith et al., "Transcoding Internet Content for Heterogeneous Client Devices", Proc. of IEEE Int. Conf. on Circuits and Systems (ISCAS), pp. 1-4, May 1998.

H. Kosch et al., "Modeling Quality Adaptation Capabilities of Audio-Visual Data", Institute of Information Technology, University Klagenfurt, Austria, 13 pages, http://www.itec.uni-klu.ac.at/~harald/codac/CODACdescription/dexa_new2.html (last visited Mar. 31, 2003).

E. Feig et al., "Fast Algorithms for the Discrete Cosine Transform", IEEE Transactions on Signal Processing, vol. 40, No. 9, pp. 2174-2193, Sep. 1992.

Jean-Claude Bajard, et al., "On-line Motion Detection", Oct. 23, 2003, pp. 1 to 10 (Electronic revision of Difdier, et al., "In-line Movement Estimation", LIM University of Provence, Dec. 1996).

"Information Technology—Coding of Audio-Visual Objects—Part 2: Visual Amendment 1: Visual Extensions", ISO/IEC JTC 1/SC 29/WG 11 N 3056, Dec. 1999, pp. ii to 524.

French International Search Report, FR0203167, Mar. 6, 2003.

\* cited by examiner

METHOD AND DEVICE FOR SELECTING A TRANSCODING METHOD AMONG A SET OF TRANSCODING METHODS

RELATED APPLICATION

This application is a divisional of application Ser. No. 10/387,426, filed Mar. 14, 2003, now U.S. Pat. No. 7,453,937, issued Nov. 18, 2008, the entire contents of which are incorporated herein by reference.

This application claims priority to French Application No. 0203167, filed Mar. 14, 2002.

FIELD

The present invention relates to a method and device for selecting a method from a set of methods of transcoding digital multimedia data, the data being liable to be transferred between at least two communication apparatuses via a communication network.

BACKROUND

Technological advances in digital communication apparatuses such as television sets, pocket microcomputers, conventional microcomputers or any other miniaturized apparatus are such that, in future years, it will very probably be possible to exchange data of a multimedia type and, for example, audio and/or video between these different apparatuses.

Market studies show, moreover, that users are ready to purchase such communication apparatuses provided that the price is not too excessive and, in particular, that the services rendered are of good quality.

Following the identification of this new market, many studies have been carried out concerning the miniaturization of electronic components, so as to obtain apparatuses with high memory and computational capacities within the smallest possible volume.

In addition, many standardization bodies have produced standards for unifying data exchanges between these apparatuses with different characteristics. These standards, such as those of the IEEE 802 family, allow both the implementation and the management of the transfer of data via a particular network.

IEEE 802.11 and its European counterpart HYPERLAN are dedicated to wireless local area networks. These are being particularly studied at the present time since they are broadband networks making it possible to transmit audio and/or video data between two machines which are geographically close.

These standards are therefore particularly adapted for developing wireless local area networks within dwellings.

The technical solutions currently being studied in the context of the above mentioned standards applied to home area networks permit wireless transmission of digital data either between a so-called server machine and a so-called client machine (point to point transmission), or between the server and several clients (multipoint communication).

In this environment, the data are stored on the server, which centralizes all the communications with the client or clients. This server can also serve as a gateway with the outside world (Internet, television, camcorder etc).

It should be noted that home area networks can be of a heterogeneous nature, that is to say they can, for example, consist partly of wireless connections and partly of cabled connections.

Though many projects are studying the implementation of services around interactive television and the exchange of information on the Internet, few of them are dealing with the problems related to the use of home area networks, namely the production of solutions for obtaining an acceptable service quality.

In this connection, it should be noted that the conveyance of data through a local area network is not a service which is easy to implement.

A communication system is known from the article "Transcoding Internet Content for Heterogeneous client devices" by J. Smith, R. Mohan, C-S. Li, Proc Int. Conf on circuits and Syst (ISCAS), May 1998, which provides for the dynamic adaptation of the content of video data to be transmitted to a communication apparatus, to the characteristics of the apparatus and to the resources of the network.

To achieve this, a method is proposed of selecting a method of transcoding which will be adapted to the category of device and to the above-mentioned characteristics of that device and of the network.

More particularly, this method of selection searches among the methods of transcoding which are adapted to the device and to the above-mentioned characteristics for the method for which a maximum fidelity value is obtained.

It should be noted that the measurement of fidelity is representative of the impact of the transcoding method.

A method of selecting a transcoding method from a set of transcoding methods is also known from the article entitled "Modeling Quality Adaptation Capabilities of Audio-Visual Data", H. Kosch, L. Böszörményi and H. Hellwagner, Institute of information technology, University Klagenfurt, Austria, July 2001.

In that article, it is proposed to classify the transcoding methods on a quality scale graduated from 0 to 1, 1 representing a perfect quality of restoration of the data while 0 signifies that the transcoded multimedia data are very little representative of the data before transcoding.

To evaluate the quality induced by a transcoding method, it is for example possible to perform, for all the transcoding methods considered, firstly a transcoding according to the method tested, then a decoding and a quality measurement.

However, this approach is costly in terms of calculation and memory space necessary.

SUMMARY

The present invention proposes to remedy at least one of the above-mentioned drawbacks by providing a new method and a new device which make it possible to evaluate the quality of methods of transcoding digital multimedia data in a simple manner and to select one of these methods based on the quality values obtained for each method.

The present invention thus relates to a method for selecting a method from a set of methods of transcoding digital multimedia data, said data being liable to be transferred between at least two communication apparatuses via a communication network, the selection method comprising the following steps:

for each transcoding method, obtaining a distortion value from a mathematical model for establishing the distortion taking into account said transcoding method, the distortion model being applied to information representing digital data, and, selecting a transcoding method as a function of the different distortion values obtained for the set of transcoding methods.

In a complementary manner the present invention relates to a device for selecting a method from a set of methods of transcoding digital multimedia data, said data being liable to be transferred between at least two apparatuses devices via a communication network, the device comprising:

for each transcoding method, means for obtaining a distortion value from a mathematical model for establishing the distortion taking into account said transcoding method, the distortion model being applied to information representing digital data, and, means for selecting a transcoding method according to the different distortion values obtained for the set of transcoding methods.

By using a distortion model to evaluate the quality of a set of transcoding methods, the complexity of calculation necessary for the quality evaluation according to the prior art is significantly reduced.

Similarly, the amount of memory necessary for the evaluation of the quality of the transcoding methods is also reduced in relation to that necessary in the prior art.

Furthermore, the selection of a transcoding method from a set of transcoding methods according to the invention takes into account the digital multimedia data which are liable to be transferred over the communication network, which is the contrary to the prior art.

This is particularly advantageous in that the applicant has realized that, according to the data considered, the impact of the transcoding method on the quality may vary considerably.

Thus, for example, a sequence of video data in which the movements are very numerous and of great amplitude will undergo a very marked reduction in quality on implementation of a transcoding method based on the reduction of the frame rate.

On the contrary, this same method applied to a more static video sequence will have much less impact on the quality.

According to one feature, the selection method comprises the following steps:

for each transcoding method, obtaining a rate value from a mathematical model for establishing the rate taking into account said transcoding method, the rate model being applied to information representing digital data, and, selecting a transcoding method according to, on the one hand, the different rate values, and, on the other hand, the different distortion values obtained for the set of transcoding methods.

Thus, the invention also provides for evaluating the rate induced by each transcoding method by taking into account the data liable to be transferred over the communication network, before selecting a method.

The selection of a method is then carried out based on the values of distortion and rate obtained for each method.

According to a first approach, the selection method comprises, prior to the obtaining step, a step of adapting the model to each transcoding method.

According to a second approach, the selection method comprises, prior to the obtaining step, a step of processing the digital data in a manner adapted to each transcoding method.

According to this second alternative approach, it is not the model that is adapted to the transcoding method but the data.

More particularly, the processing adapted to the transcoding method is applied to the information representing the digital data to which the distortion model, and, possibly, the rate model, are applied.

For example, in the case of video data, if the transcoding method is a method of reducing the frame rate, the video data would have been made to undergo a reduction in the number of images per second.

Based on the video data which results from this reduction, certain information is determined which represents these data and to which the aforementioned model or models are applied.

According to one feature, the selection method comprises a step of testing the compatibility of each transcoding method with at least one constraint associated with at least one of the communication apparatuses and/or with the network.

More particularly, the data liable to be transferred must be adapted to the context in which they are transmitted, i.e., for example, one or more characteristics of the communication apparatus or apparatuses which are to receive the data.

One characteristic may be, for example, the calculation capacity of one of the apparatuses.

It may also be the authorized rate over the communication network.

According to another feature, the distortion model establishes a relationship between the distortion and the energy of the signal represented by the digital data.

According to another feature, the rate model establishes a relationship between the rate and the energy of the signal represented by the digital data.

The invention also concerns a communication apparatus comprising a device as briefly disclosed above.

According to another aspect, the invention also relates to:

an information storage means which can be read by a computer or a microprocessor containing code instructions for a computer program for executing the steps of the method according to the invention as for the one briefly disclosed above, and a partially or totally removable information storage means which can be read by a computer or a microprocessor containing code instructions for a computer program for executing the steps of the method according to the invention as for the one briefly disclosed above.

According to yet another aspect, the invention relates to a computer program which can be loaded into a programmable apparatus, containing sequences of instructions or portions of software code for implementing steps of the method according to the invention as briefly disclosed above, when said computer program is loaded and executed on the programmable apparatus.

As the features and advantages relating to the device, to the communication apparatus comprising such a device, to the information storage means and to the computer program are the same as those disclosed above concerning the method according to the invention, they will not be repeated here.

BRIEF DESCRIPTION OF THE DRAWINGS

Other features and advantages of the present invention will emerge more clearly from a reading of the following description, given with reference to the accompanying drawings, in which.

DETAILED DESCRIPTION

Figure 1:
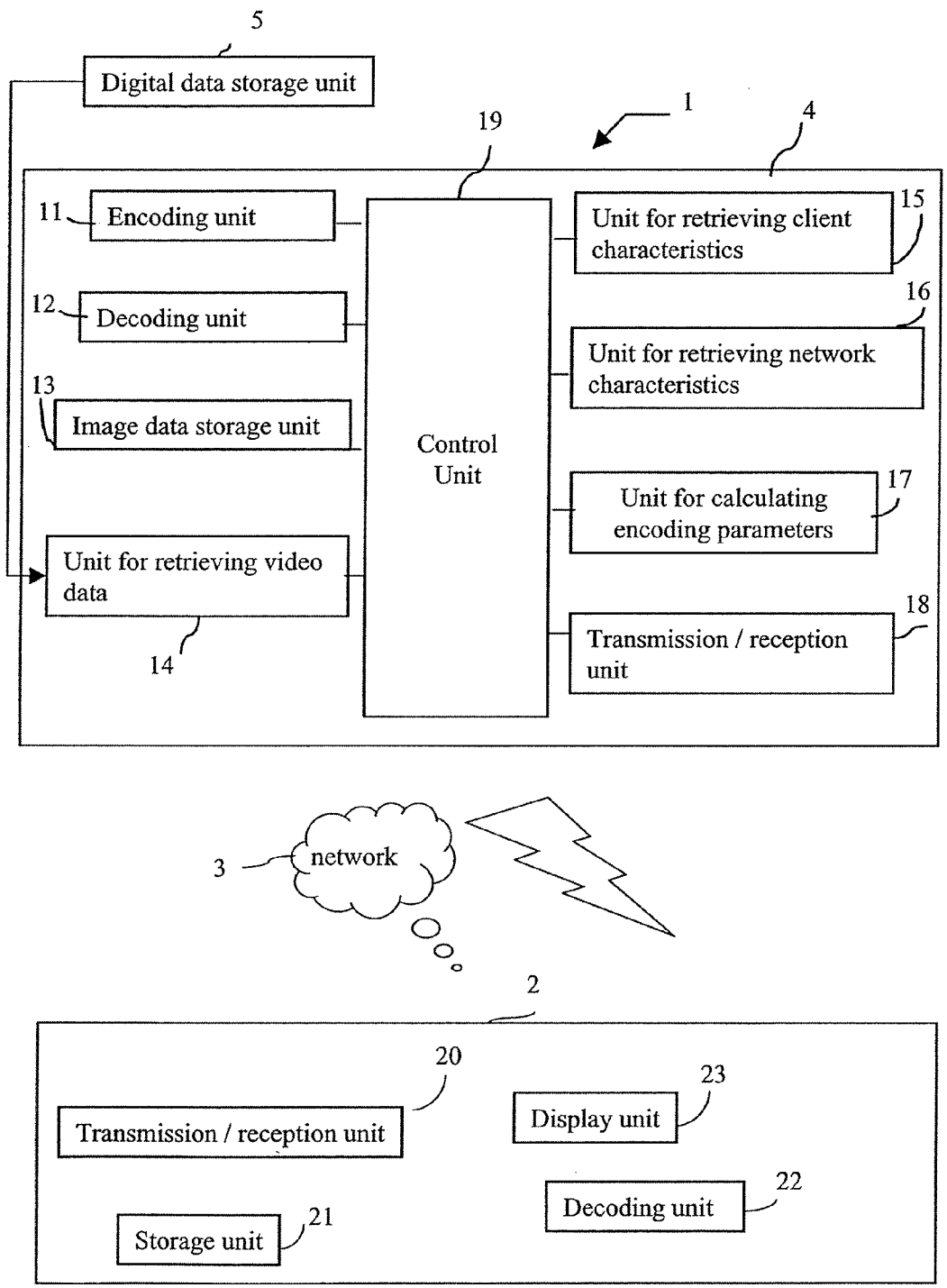
FIG. 1 shows schematically a communication architecture of the client-server type in which the invention can be implemented.

FIG. 1 shows a communication architecture of the client-server type in which the invention is advantageously implemented.

In this figure, a first communication apparatus 1 fulfilling the role of the server is connected to a second communication apparatus 2, which is the client machine, by means of a communication network 3 and a connection which is considered as being established.

This network is for example a wireless local area communication network within a dwelling.

More particularly, this network is in accordance with the standard IEEE802.11.

The example considered concerns a point to point transmission of data between the server 1 and the client machine 2.

However, the principle remains applicable to the case where the server is connected simultaneously to several client machines which may require multimedia digital data from the server.

It is however necessary, in this case, to take into account, on the one hand, the management of the processes of adaptation and transmission in parallel with the different adapted versions of the data requested and on the other hand the multiple accesses to the memory or memories of the server.

It should be noted that the data stored in the server can have been received from the environment external to the dwelling, for example through another communication network such as the Internet.

The data grouped together under the term multimedia data may, in non-limiting manner, be fixed images, videos, sound, data of the text type (e.g. graphical documents etc), documents in HTML language, signals issuing from a facsimile machine or printer etc.

In the example embodiment under consideration, only video data will be considered and these will be transmitted without loss over the network 3.

The device according to the invention will generally make it possible to select a transcoding method from a set of transcoding methods by taking into account the content of the data requested by a client machine.

The device 4 according to the invention is for example integrated into the server 1 in FIG. 1 and can comprise electronic elements and/or software elements.

However, the device according to the invention could, for example, be merged with the server 1.

The device 4 comprises units 11 and 12, which make it possible respectively to encode and decode a video.

The server comprises a unit 5 for storing digital data such as videos.

The algorithms of the encoding and decoding methods will be described respectively with reference to FIGS. 3a and 3b.

It should be noted that the videos are created, for example, by a digital camcorder or any other data acquisition means or are transmitted by an external communication network and are stored in the unit 5, which can be included or not in the device 4.

This unit can for example be a local or distributed database.

In addition, the videos are stored, according to a preferred embodiment of the invention, in compressed form, using the encoding method implemented in the encoding unit 11.

The device 4 also comprises a storage unit 13 intended to temporarily store digital data and encoded videos, and a unit 14 for retrieving data characteristic of the videos from the storage unit 5.

The data retrieved by the unit 14 are either the values associated with each of the pixels of each image of a video or the information peculiar to this video, namely the size of the video file, the path for accessing this video and, where the video is stored in compressed form, the encoding parameters which were used for encoding this video.

The device 4 also comprises a unit 15 for retrieving the characteristics of the client machine 2, namely, for example, the computational capacity and the resolution of its display screen.

It should be noted that these characteristics can be obtained following the transmission of a specific request by the device 4.

The device 4 also comprises a unit 16 for retrieving the characteristics of the network 3, a unit 17 for determining the encoding parameters, and a unit 18 for transmitting/receiving digital data.

The unit 18 makes it possible to carry out the transmission of data to the client machine 2 through the network 3, as well as the reception of data coming from the client machine.

The device 4 according to the invention also comprises a unit 19 for controlling the different operations performed.

It should be noted that the different units which make up the device according to the invention, and more generally the server, are resident on the same machine.

However, it can be envisaged distributing these units over several server machines and establishing communications between these different units through the communication network 3.

Since this distribution of the units in no way modifies the implementation of the invention, it will be considered hereinafter, for reasons of simplicity, that all the units are located on the same machine, which will be referred to as the server.

The client machine 2 comprises a digital data transmission/reception unit 20.

This unit 20 makes it possible to carry out the transmission of data to the device 4, through the network 3, and the reception of data coming from the device.

The client machine 2 also comprises a digital data storage unit 21, a decoding unit 22 identical to the unit 12 of the device 4 and a display unit 23, for displaying decoded videos.

Figure 2:
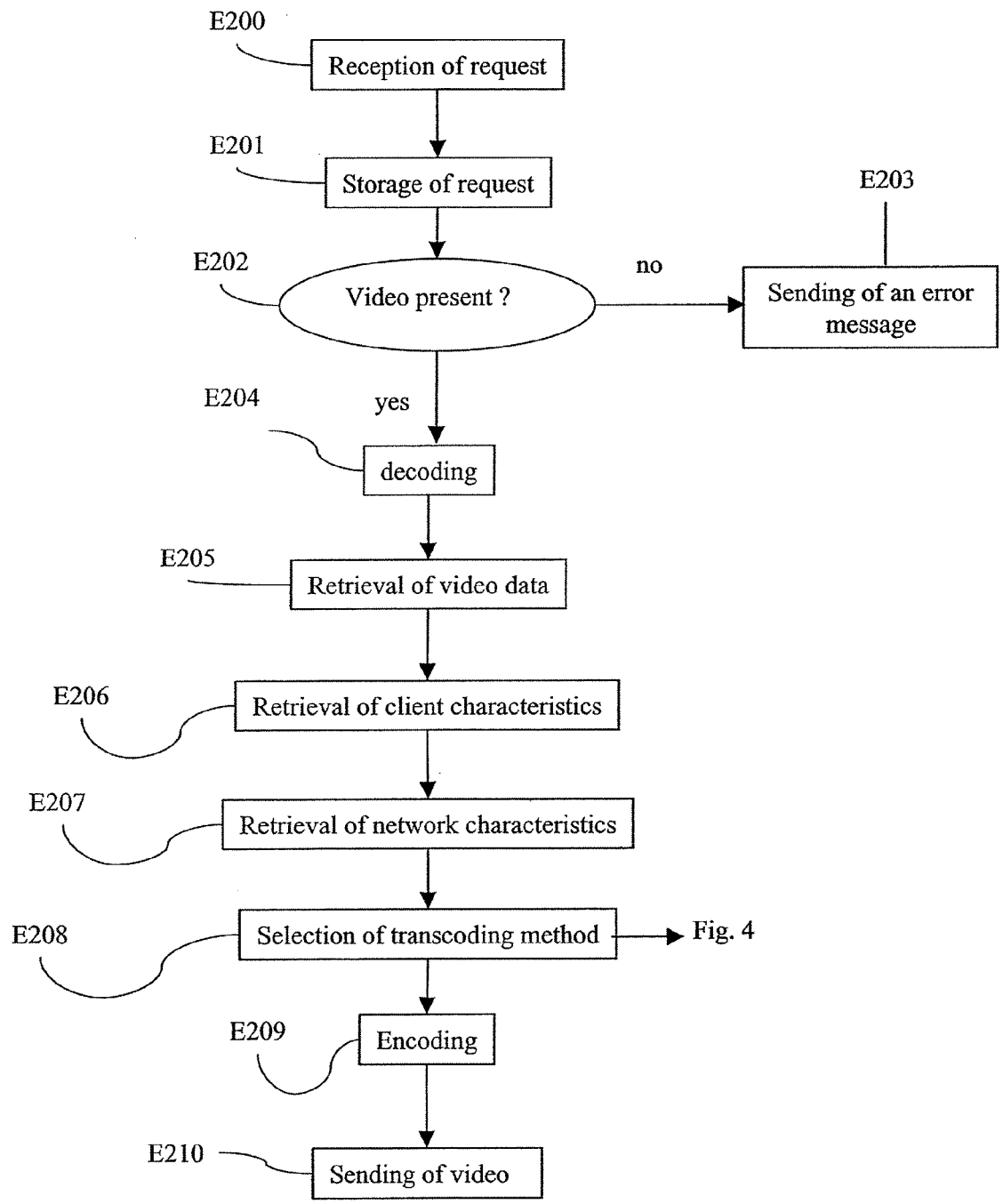
FIG. 2 shows a video data processing algorithm according to the invention.

FIG. 2 illustrates an algorithm comprising different instructions or portions of software code corresponding to steps of the method according to the invention.

The computer program denoted "Progr" which is based on this algorithm is stored in the temporary data storage unit 13 of FIG. 1 and executed by the unit 17 under the control of the control unit 19, which thus makes it possible to implement the method according to the invention.

Figure 7:
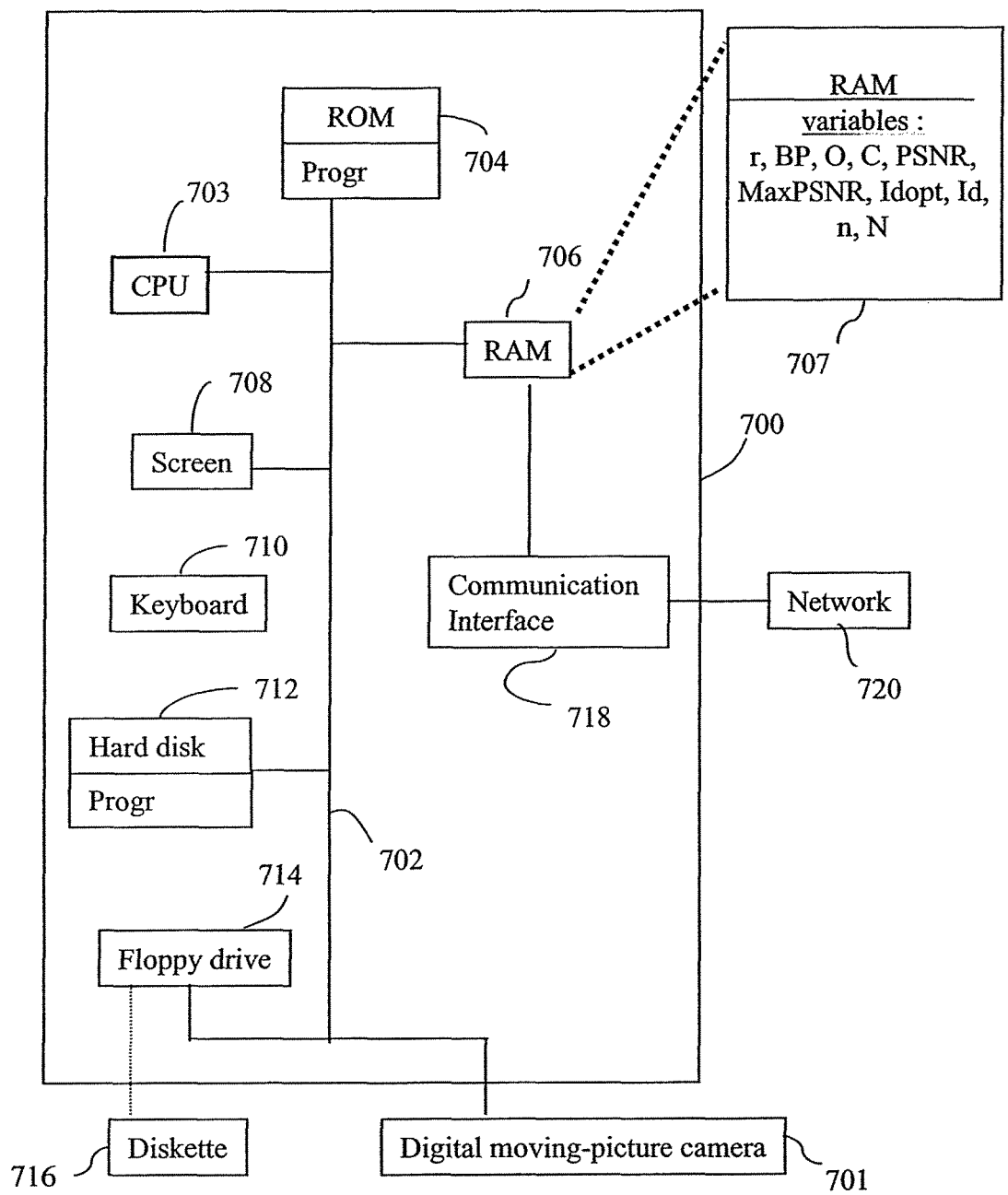
FIG. 7 is an embodiment of a programmable apparatus implementing the invention.

This program is also stored in the apparatus of FIG. 7.

The algorithm of FIG. 2 comprises a first step denoted E200, during which the device 4 of FIG. 1 and, more particularly, the reception unit 18 receives a request sent by the client machine 2 from the transmission unit 20.

For example, this request is in the form of a string of characters making it possible to uniquely identify video data stored in the storage unit 5 of the server 1.

During the following step E201, the request coming from the client machine 2 is transferred to the temporary storage unit 13 for the purpose of storage.

Step E201 is followed by a step E202, during which a test is performed to determine whether the video data forming the subject of the request from the client machine are available in the storage unit 5.

If the test carried out during this step is negative, the following step E203 provides for sending an error message to the client machine informing it that the requested video data are not available on the server.

If affirmative, step E202 is followed by a step E204 during which the decoding unit 12 of the device of FIG. 1 decodes the video data according to the encoding parameters supplied, for example, by the header of the bit stream stored in the storage unit 5.

It will be noted that each image of the video sequence requested by the user is divided into blocks of data of 8×8 pixels.

Each group of four blocks forms a macroblock of 16×16 pixels.

The encoding of an image is carried out on each of the macroblocks according to two distinct encoding modes: one denoted I for the Intra encoding mode and the other denoted P for the predictive or Inter encoding mode.

A sequence of images of 1 second will be encoded in the following manner: IPPIPPIPPIPPIPPIPPIPPIPPIPP . . . .

This means that the first image is encoded according to the Intra mode, the following two according to the Inter mode, the following according to the Intra mode, the following two according to the Inter mode, etc.

Thus, for a sequence of 30 images per second, 10 images will be encoded in Intra mode and 20 images in Inter mode.

It should be noted that a sequence of images will hereinafter be referred to as a segment.

During the decoding performed at step E204, unit 12 counts the number of macroblocks encoded according to each mode for each image and calculates the variance of each macroblock.

Once the decoding of the video data has taken place, the decoded data presented, for example, in YUV format, as well as the aforementioned encoding parameters are stored in the storage unit 13.

It should be noted that a video format of the YUV type means that the video concerned has three components, the component Y for luminance and the components U and V for chrominance.

It should be noted that for each image of the video sequence, there is stored, in the unit 13, an average quantization parameter (average of the quantization parameters of the macroblocks of the image), the number of macroblocks encoded in Inter mode and in Intra mode, as well as an average variance (average of the variances of the macroblocks of the image).

Step E204 which has just been described is followed by a step E205, during which the unit 14 carries out a retrieval of the video data.

During the following step E206, the characteristics of the client machine 2 which sent the request mentioned at step E200 are obtained.

The characteristics of the client machine are for example retrieved following on from the transmission of a request to obtain these characteristics, from the device 4 of FIG. 1 to the client machine 2, through the communication network 3.

These characteristics are principally the computational capacity of the client machine 2, namely the total number of operations which it can perform and the resolution of its display unit 23 (screen).

These characteristics are stored in a temporary fashion in the storage unit 13 of the device 4 in FIG. 1.

Preferentially, the computational capacity of the client machine is equal to the speed of the processor thereof, expressed as a number of elementary operations per second.

Step E206 is followed by a step E207 during which the device 4 of FIG. 1 obtains the characteristics of the communication network 3, such as the bandwidth available for transmitting the video data from the device 4 to the client machine 2, the packet loss rate, the bit error rate etc.

Preferentially, the characteristics of the network taken into account will be limited to the available bandwidth.

These characteristics are retrieved by the unit 16, which then stores them in the temporary storage unit 13.

Step E207 is followed by the step E208 which selects, from the unit 17, a transcoding method from a given set of transcoding methods, based on an evaluation of the quality of each method, taking into account the video data to be transmitted.

Furthermore, the method will, for example, also be selected so as to adapt the video data to the characteristics of the client machine and to the characteristics of the network.

The transcoding methods proposed in this set are for example the following: keeping the original compressed sequence, reducing the spatial resolution from CIF (352 by 288 format) to QCIF (176 by 144 format), re-quantization to reduce the rate by 10%, re-quantization to reduce the rate by 20%, and re-quantization to reduce the rate by 30%.

The details of the operations performed during step E208 will be provided subsequently during the description given with reference to FIG. 4.

This step is performed by the unit 17 of the device 4 of FIG. 1 under the control of the control unit 19 and using the information available in the storage unit 13.

It will be noted that the transcoding methods presented above are classified into two categories: reduction of the spatial resolution (passage from CIF to QCIF format) and re-quantization.

1) To reduce the spatial resolution, the encoding unit 11 will begin by subsampling each image of the original video sequence by deleting one out of every two pixels in each line of each image of the original sequence, then, by deleting one pixel out of every two in each column of each image of the original sequence.

The unit 11 will next proceed with the actual encoding of the subsampled sequence.

During the encoding, the choice of the encoding mode of the macroblocks of the transcoded sequence will be made as a function of the encoding modes of the macroblocks of the original sequence.

It is known that on changing from CIF format to QCIF format, the number of macroblocks is divided by 4, that is to say that a macroblock of the transcoded sequence corresponds to four macroblocks of the original sequence.

If in the four original macroblocks, a majority of macroblocks encoded in Intra mode is to be found, then the macroblock of the transcoded sequence will be encoded in Intra mode.

Conversely, if there is a majority of macroblocks encoded in Inter mode, the macroblock of the transcoded sequence will be encoded in Inter mode.

If no mode is in the majority, the macroblock will be encoded in Intra mode.

2) To re-quantize the sequence, the sequence will be encoded with a rate constraint equal to the initial rate of the original sequence reduced by the rate percentage specified by the transcoding method.

A rate control loop such as that proposed in the article entitled "*Rate control for low-delay Video communication*"

by J. Ribas-Corbera, S-Lei, *Draft ITU-telecommunications standardization sector*. Ref: Q15-A-20 will make it possible to control the rate of the encoding unit.

For this transcoding method, the encoding modes of the original macroblocks will be kept in the transcoded sequence.

The step E208 of the algorithm is then followed by a step E209 which proceeds with the encoding of the video data following the parameters defined at the step E208 (selected transcoding method).

During the following step E210, the device 4 of FIG. 1 and, more particularly, the transmission unit 18 thereof transmits the video data which were previously compressed at step E208 to the client machine 2.

It should be noted that the transmission of the compressed video data preferably takes place "on the fly", the process being known as "streaming", that is to say the information necessary to the user for reconstructing an image is stored in the storage unit 13 and then transmitted to the client machine 2 before all the video data are compressed.

Thus the user receives the information at the client machine 2 in packets, in each of which there is information enabling this user to decode a current image.

Figure 3A:
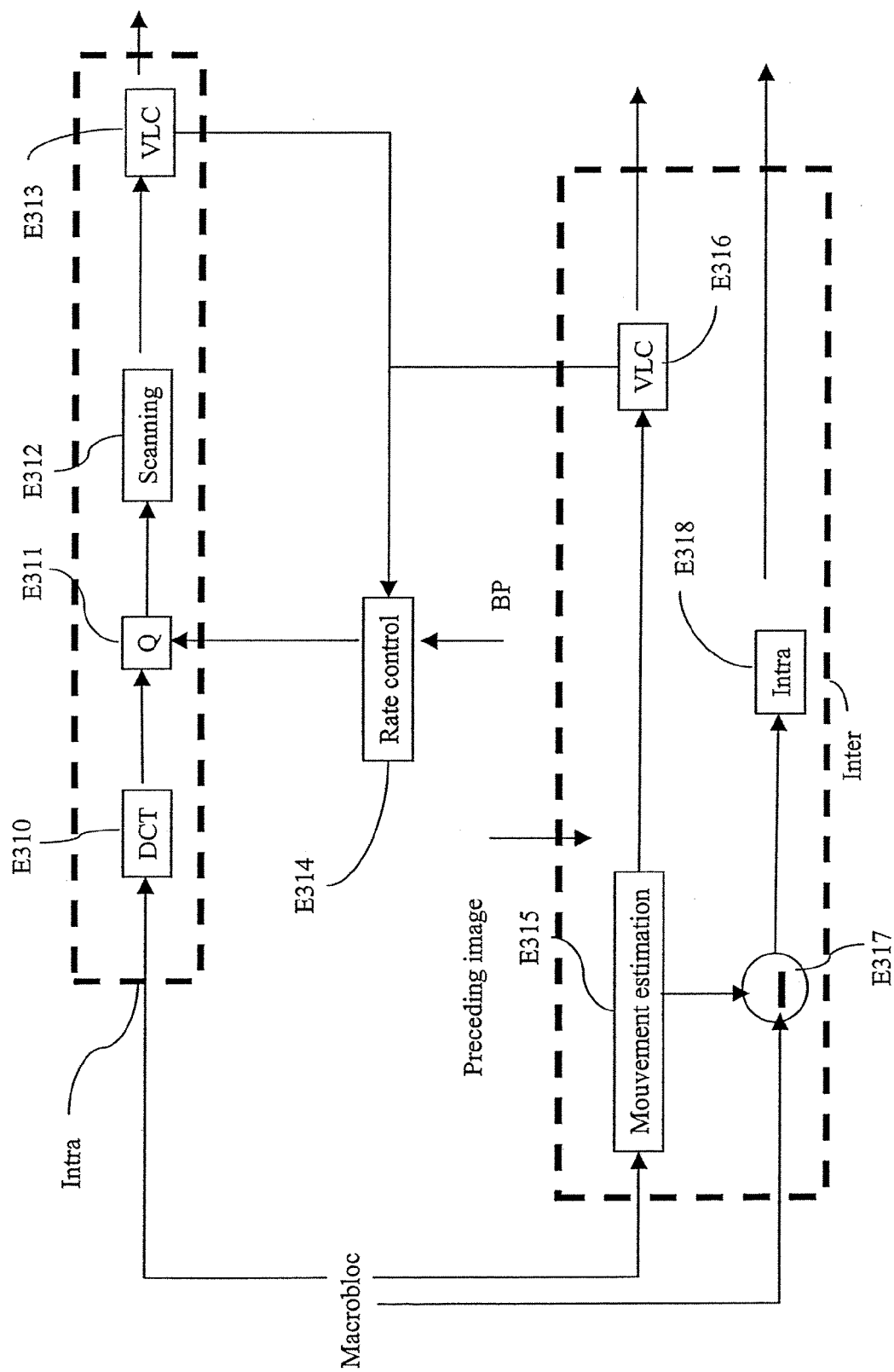
FIG. 3a shows a video data encoding algorithm.
Figure 3B:
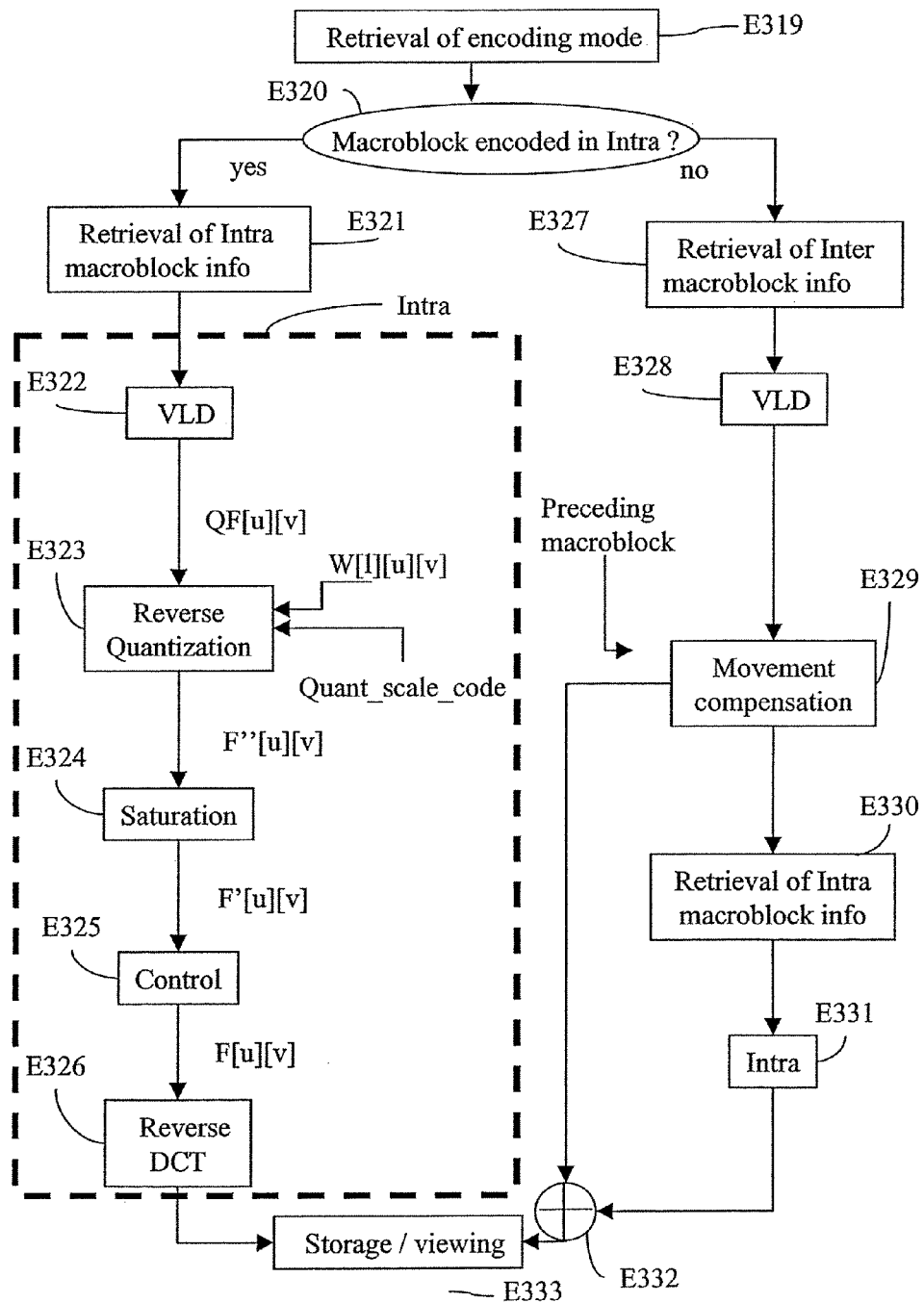
FIG. 3b shows a video data decoding algorithm.

FIGS. 3a and 3b illustrate respectively the encoding and decoding of a color video in YUV format.

According to a preferred embodiment of the invention,
the video decoder used for implementing this invention is in accordance with the visual part of the standard MPEG-4 (Information Technology-Generic Coding of Audio-Visual Objects=Part 2: Visual, ISO/IEC JTC1/SC 29/WG11 N 3056, December 2000).

In the example dealt with here, the video will be considered to be a single object of rectangular shape.

Consequently only a restricted set of compression tools which allow texture decoding and movement compensation will be taken into account. The tools necessary for the decoding of the arbitrary form of an object are therefore not used here.

It should be noted that the texture of an image is given by the values of the pixels of the image which are expressed in three components.

The videos are stored on the server 1 in a form compressed to mp4 format conforming to the MPEG-4 standard.

Use is made for example of the YUV format of the type 4:2:0, which means that the chrominance components (U, V) have four time fewer samples (pixels) than the luminance components (Y).

FIG. 3a illustrates the encoding method used by the encoding unit 11 of FIG. 1.

In Intra mode, the encoding takes place block by block in accordance with steps E310 to E313 in FIG. 3a.

In this encoding mode, each block constitutes an elementary data unit which is encoded independently of the other blocks.

It should be recalled that the values of the pixels of each image of the segment of images to be encoded are stored temporarily in the temporary storage unit 13 in FIG. 1 and constitute a video which is referred to as the original video.

Where the video is stored in the storage unit 5, the decoding method is applied at step E204 of FIG. 2 so as to obtain a video in YUV format.

The values of the video thus reconstructed are stored in the temporary storage unit 13 and in the storage unit 5.

The method of encoding a block in Intra mode begins with a step E310 during which the discrete cosine transform is calculated according to the known method described in the article entitled "*Fast Algorithms for the Discrete Cosine Transform*". Feig and S. Winograd, *IEEE Trans. On Signal Proc.*, vol. 40, No. 9, September 1992.

Step E310 is followed by a step E311, which makes provision for quantizing the transformed coefficients obtained during step E310.

Step E311 is followed by a step E312 during which the quantized coefficients are ordered so that the variable-length encoding method used during the subsequent step E313 is as effective as possible.

For this purpose, the scanning method is used which is described in the standard *Information Technology—Generic Coding of Audio-Visual Objects*=Part 2: visual, ISO/IEC JTC 1/SC 29/WG11 N3056, December 2000.

Step E312 is followed by a step E313 according to which the statistical encoding of the ordered coefficients is carried out according to the variable-length encoding method described in the standard *Information Technology—Generic Coding of Audio-Visual Objects*=Part 2: visual, ISO/IEC JTC 1/SC 29/WG11 N3056, December 2000.

At the end of step E313, the statistically encoded coefficients are stored in the temporary storage unit 13 and are concatenated with the other encoding information of the current image.

In predictive or Inter mode, the encoding is carried out macroblock by macroblock, where each macroblock constitutes an elementary data unit which is encoded independently of the others.

Each of the macroblocks can be encoded either in Intra mode or in Inter mode.

If the macroblock is encoded in Intra mode, then the encoding is carried out according to steps E310 to E313 described previously.

If the macroblock is encoded in Inter mode, the encoding is carried out according to steps E315 to E317, which will be explained below.

During step E315, a conventional method of movement estimation by comparison of macroblocks is applied.

The algorithms used are based on the simplifying hypothesis according to which the pixels of the same macroblock have the same movement imparted to them.

The movement vector of a macroblock of a current image is then determined by finding the macroblock with the greatest resemblance in the previous image in a pre-selected search window.

If the dimensions of the search window exert an influence on the time for calculating the movement estimation, the major problem related to the movement estimation which is carried out by comparing macroblocks remains the determination of the distance between the macroblocks.

Use will preferably be made of a movement estimation method described in the article "In-line Movement Estimation", by L. Difdier, R. Kamdem, LIM University of Provence, December '96.

This method makes it possible to obtain a movement vector with two translation movement components.

To obtain a bitstream conforming to the MPEG-4 standard, this movement vector is encoded differentially with respect to a prediction carried out on the basis of movement vectors of the macroblocks already encoded in the immediate neighborhood of the current macroblock.

Step E315 is followed by a step E316 during which the previously determined differential movement vector is statistically encoded.

The coefficients thus obtained are stored in the temporary storage unit 13 and are concatenated with the other encoding information of the current image.

Once the movement for a macroblock has been estimated during the execution of step E315, then, in accordance with step E317, a so-called predicted macroblock is constructed from the macroblock of the previous image to which the movement vector associated with this macroblock is applied.

Next, a so-called difference macroblock is calculated between the macroblock of the current image and the predicted macroblock.

The variance of this difference macroblock is then measured.

If the variance is greater than a predetermined threshold, then the macroblock of the current image is encoded in Intra mode.

This macroblock will be encoded in Inter mode in the opposite case.

Step E317 is followed by a step E318 during which either the difference macroblock is encoded according to the Intra mode described above, or the current macroblock is encoded according to the Intra mode.

The coefficients resulting from the Intra encoding mode are stored in the temporary storage unit 13 and are concatenated with the other encoding information of the macroblock of the current image.

The parameters used during the quantization and variable-length encoding steps are defined for each macroblock, whether in Intra mode or Inter mode.

For this purpose, a conventional rate control method is used during a step E314.

This method makes it possible to control the allocation of rate for each macroblock so as to not to exceed the total rate allocated to the transmission of the compressed video.

In the example described, the maximum rate value is fixed by the value BR.

The data encoded and stored in a temporary fashion in the unit 13 are put in the MPEG-4 format, as indicated in the standard *Information Technology—Generic Coding of Audio-Visual Objects*=Part 2: Visual, ISO/IEC JTC 1/SC 29/WG11 N3056, December 2000, before being transmitted over the network 3 in FIG. 1 to the client machine 2.

It should be noted that the encoding mode used for encoding each macroblock forms part of the information transmitted.

FIG. 3b illustrates the decoding method used by the decoding unit 12 of the device 4 and by the decoding unit 22 of the client machine 2 in FIG. 1.

The decoding method will be described when it is used in the client machine 2 and, more particularly, at the units 20, 21 and 22.

The transposition of this description to the decoding method used by the device 4 of the server 1 is carried out easily by replacing the units 20, 21 and 22 respectively with the units 18, 13 and 12.

The client machine 2 has a storage unit 21 supplied with the digital data coming from the device 4 by means of the connection established between the two machines through the network 3.

These data are received by the reception unit 20 in the form of packets which contain the information necessary for decoding one or more macroblocks of the current image.

The storage unit 21 is capable of extracting information from the bitstream generated by the encoding unit 11 of the device 4 and supplying it to the decoding unit 22 of the client machine 2.

FIG. 3b illustrates the decoding of a macroblock encoded either in Intra mode, as indicated by steps 322 to 326, or in Inter or predictive mode as indicated by steps 327 to 332.

The decoding algorithm begins with a step E319 during which the encoding mode of the current macroblock is retrieved.

During step E320, a test is carried out to determine whether the macroblock was encoded in Intra mode.

If so, step E320 is followed by a step E321, which makes provision for retrieving, from the storage unit 21, the statistical coefficients (variable-length codes) related to this macroblock.

Step E321 is followed by a step E322, which performs the decoding of these coefficients in accordance with the table of coefficients described in the standard *Information Technology—Generic Coding of Audio-Visual Objects*=Part 2: Visual, ISO/IEC JTC 1/SC 29/WG11 N3056, December 2000.

The coefficients thus obtained form a set of bi-dimensional data denoted QF[u][v].

During the following step E323, an inverse quantization operation is performed on the values of the set of data QF[u][v] in order to obtain the bi-dimensional table F"[u][v] according to the quantization tables described in the standard *Information Technology—Generic Coding of Audio-Visual Objects*=Part 2: Visual, ISO/IEC JTC 1/SC 29/WG11 N3056, December 2000.

During the following step E324, a saturation method is applied to the values of the coefficients in the bidimensional table F"[u][v] according to the standard *Information Technology—Generic Coding of Audio-Visual Objects*=Part 2: Visual, ISO/IEC JTC 1/SC 29/WG11 N3056, December 2000, so as to obtain the bi-dimensional table F'[u][v] whose values belong to the interval $[-2^{bits\ per\ pixel\ +3}, 2^{bits\ per\ pixel\ +3} -1]$.

The number of bits per pixel is preferably 8.

During the following step E325, an operation of controlling the saturated coefficients is performed so as to obtain the DCT coefficients F[u][v].

During the following step E326, the values of the pixels of the current macroblock are reconstructed as a function of the DCT coefficients F[u][v] using the decoding method described in the article "*Fast Algorithms for the Discrete Cosine Transform*", E. Feig and S. Winograd, *IEEE Trans. On Signal Proc.*, vol. 40, No. 9, September 1992.

These reconstructed values are stored in the storage unit 21 with a view to being displayed on the display unit 23.

The algorithm for decoding a macroblock is given below.

The values of the coefficients dc_scaler, quantizer_scale and of the matrix W[l][u][v] used in this algorithm are values defined by the standard *Information Technology—Generic Coding of Audio-Visual Objects*=Part 2: Visual, ISO/IEC JTC 1/SC 29/WG11 N3056, December 2000.

```
for (v=0; v<8;v++) {
    for (u=0; u<8;u++) {
        if (QF[u][v] == 0)
            F"[u][v] = 0;
        else if ( (u==0) && (v==0) && (macroblock_intra) ) {
            F"[u][v] = dc_scaler * QF[u][v];
        } else {
            if ( macroblock_intra ) {
                F"[u][v] = ( QF[u][v] * W[0][u][v] * quantiser_scale ) /
                    32;
            } else {
                F"[u][v] = ( ( ( QF[u][v] * 2 ) + Sign(QF[u][v]) ) *
                    W[1][u][v]
                * quantiser_scale ) / 32;
            }
        }
    }
```

```
        }
    }
    sum = 0;
    for (v=0; v<8;v++) {
        for (u=0; u<8;u++) {
            if ( F"[u][v] > 2^{bits\_per\_pixel + 3} - 1 ) {
                F'[u][v] = 2^{bits\_per\_pixel + 3} - 1;
            }else {
                if ( F"[u][v] < -2^{bits\_per\_pixel + 3} ) {
                    F'[u][v] = -2^{bits\_per\_pixel + 3};
                } else {
                    F'[u][v] = F"[u][v];
                }
            }
            sum = sum + F'[u][v];
            F[u][v] = F'[u][v];
        }
    }
    if((sum & 1) == 0) {
        if ((F[7][7] & 1) != 0) {
            F[7][7] = F'[7][7] - 1;
        } else {
            F[7][7] = F'[7][7] + 1;
        }
    }
}
```

The method for the discrete cosine transformation of a pixel f(x,y) of a block of size N×N is given by the following equation:

$$F(u, v) = \frac{2}{N} C(u)C(v) \sum_{x=0}^{N-1} \sum_{y=0}^{N-1} f(x, y) \cos\frac{(2x+1)u\pi}{2N} \cos\frac{(2y+1)v\pi}{2N}$$

with u, v=0, 1, 2, ... N−1,
where x, y are the spatial coordinates, u, v are the coordinates in the transformed domain, and $$C(u), C(v) = \begin{cases} \frac{1}{\sqrt{2}} & \text{for } u, v = 0 \\ 1 & \text{otherwise} \end{cases}$$

Each pixel is represented by n bits (in order to represent one of the components Y, U or V) and the transformed coefficients are represented by (n+4) bits. The amplitude of the DCT coefficients is in the interval $[-2^{n+3}:+2^{n+3}-1]$.

Use is preferably made of a fast DCT encoding/decoding method.

This method, described in the article "Fast Algorithms for the Discrete Cosine Transform", E. Feig and S. Winograd, IEEE Trans. On Signal Proc., vol. 40, No. 9, September 1992, makes it possible to encode/decode macroblocks of size 2 m (here m=3) according to the following equation:

$$Y = C_8 * Y$$

where Y is the vector of the DCT coefficients of dimension 8 and $C_8$ the 8*8 matrix of DCT coefficients.

This matrix can be factorized and, after a few algebraic manipulations, this matrix is equal to $C_8 = P_8 * K_8 * B_8$, where $P_8$ is a matrix of permutation of the signs of dimension 8*8, $K_8$ and $B_8$ are matrices of coefficients of dimension 8*8 which have been defined so as to obtain a fast encoder/decoder.

Consecutively to step E326, the step E333 provides for a storage and viewing of the decoded macroblocks from units 21 and 23. The current image is reconstructed once all the macroblocks of that image are decoded and viewed.

Returning to step E320, if the result of the test is negative, this means that the macroblock was encoded in Inter or predictive mode.

During the following step E327, information is then retrieved from among the digital data transmitted by the device 4 and stored in the storage unit 21 of the client machine 2.

This information is peculiar to the encoding of the macroblock in Inter mode and is for example the statistical coefficients (variable-length codes) related to this macroblock.

Step E327 is followed by a step E328, which makes provision for decoding these statistical coefficients so as to obtain the differential movement vector.

During the following step E329, the movement vector is reconstructed from the differential movement vector and the movement vector (Px,Py) of the macroblock of the previous image disposed at the same spatial position.

The algorithm used is as follows:

```
r_size = vop_fcode − 1
f = 1 << r_size
high = ( 32 * f) − 1;
low = ((−32) * f );
range = ( 64 * f );
if ( (f == 1) || (horizontal_mv_data == 0) )
    MVDx = horizontal_mv_data;
else {
    MVDx = ( ( Abs(horizontal_mv_data) − 1 ) * f ) +
    horizontal_mv_residual + 1;
        if (horizontal_mv_data < 0)
            MVDx = − MVDx;
}
if ( (f == 1) || (vertical_mv_data == 0) )
    MVDy = vertical_mv_data;
else {
    MVDy = ( ( Abs(vertical_mv_data) − 1 ) * f ) +
    vertical_mv_residual + 1;
        if (vertical_mv_data < 0)
            MVDy = − MVDy;
}
MVx = Px + MVDx;
if ( MVx < low )
    MVx = MVx + range;
if (MVx > high)
    MVx = MVx − range;
MVy = Py + MVDy;
if (MVy < low )
    MVy = MVy + range;
if (MVy > high)
    MVy = MVy − range;
```

The parameters of the bit stream are such that the components MVDx and MVDy of the differential movement vector belong to the interval [low; high].

The extreme values of this interval are chosen when the decoder is implemented.

Moreover, the components of the reconstructed movement vector, MVx and MVy, also belong to this interval. The values which define this interval for the movement vectors are defined by the standard *Information Technology—Generic Coding of Audio-Visual Objects*=Part 2: Visual, ISO/IEC JTC 1/SC 29/WG11 N3056, December 2000.

It should be noted that r_size, f, MVDx, MVDy, high, low and range are variables, whereas the data horizontal_mv_data, vertical_mv_data, horizontal_mv_residual and vertical_mv_residual are extracted from the bit stream.

The variable vop_fcode refers to the prediction mode used which is extracted from the bit stream.

During this same step E329, the macroblock of the previous image is compensated for movement, that is to say the macroblock is moved by the movement vector which has just been reconstructed.

During the following step E330, the information peculiar to the encoding of the macroblock in Intra mode is retrieved and, in particular, the statistical coefficients which represent the difference macroblock.

During the following step E331, the difference macroblock is reconstructed from these statistical coefficients according to the Intra decoding method described previously, during the execution of steps E322 to E326.

Step E331 is followed by a step E332 which calculates the sum of the compensated macroblock of step E329 and the difference macroblock obtained at step E331.

Step E332 is followed by a step E333 which organizes the storage of the decoded macroblocks in the unit 21.

The image is then displayed on the display unit 23 once all the macroblocks have been decoded.

Figure 4:
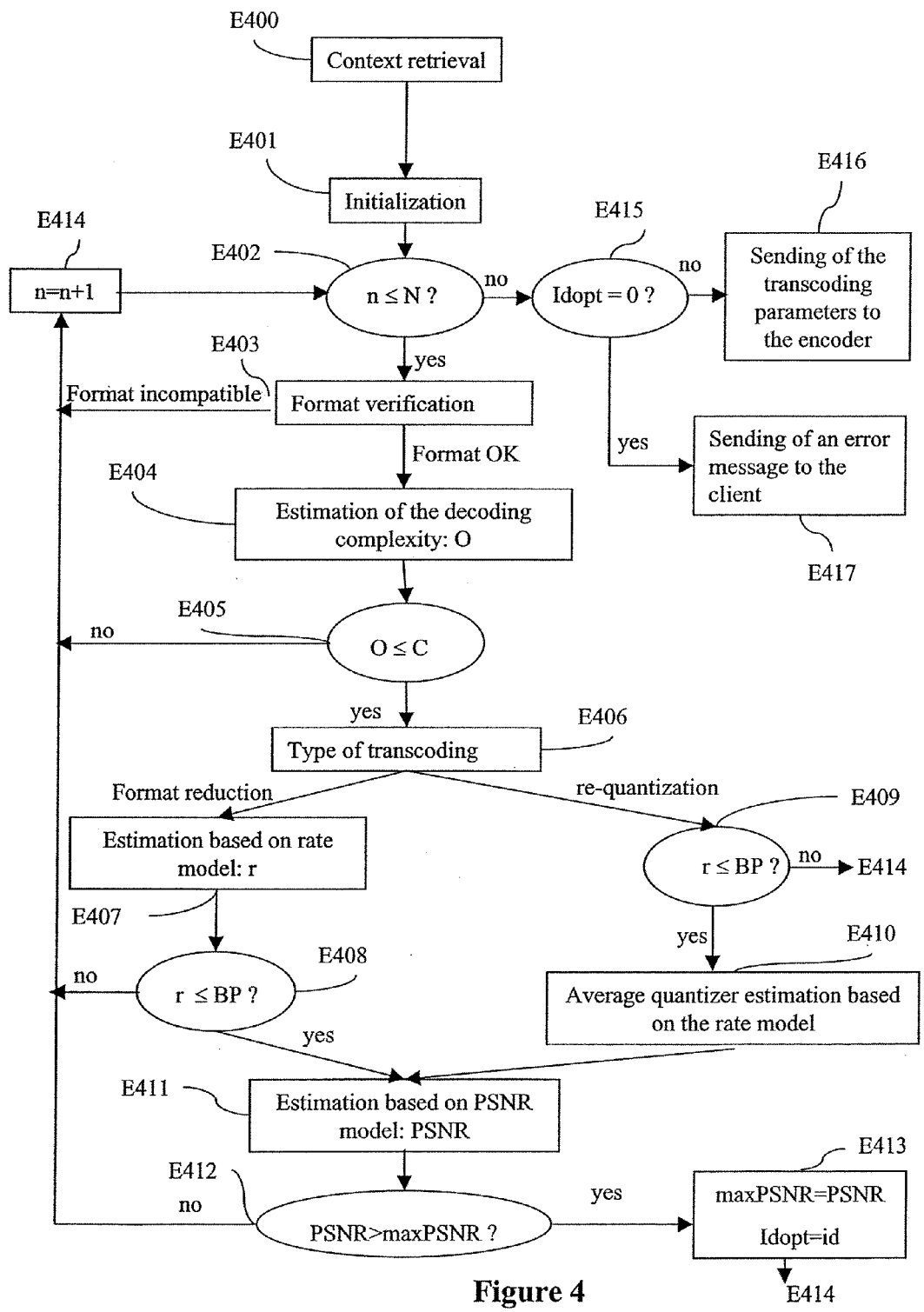
FIG. 4 shows an algorithm for selecting a method for transcoding digital multimedia data according to the invention and which corresponds to step E208 of the algorithm in FIG. 2.

FIG. 4 illustrates the algorithm detailing the different operations performed during step E208 of FIG. 2.

More particularly, this algorithm comprises different instructions or portions of software code corresponding to steps of the method of selecting a method for transcoding digital multimedia data according to the invention.

The computer program which is based on this algorithm is stored in the temporary data storage unit 13 of FIG. 1 and executed by the unit 17 under the control of the control unit.

This program forms part of the program "Progr" mentioned above with reference to FIG. 2 and is also stored in the apparatus of FIG. 7.

The execution of the computer program based on this algorithm will implement the method making it possible to evaluate the quality of several transcoding methods taking into account the data to be transmitted and to rapidly select a method based on the different quality values obtained.

In the case of video data, the transcoding method selected will be that which supplies the client machine with an optimal visual quality.

Furthermore, this method will also enable a transcoding method to be selected in a manner adapted to one or more characteristics of the client machine 2, i.e. its calculation capacity, the screen resolution, the available memory, and/or the resources available on the communication network 3, i.e. the bandwidth.

The algorithm of FIG. 4 begins with a step E400 during which the context is retrieved in which the data will be transmitted from the device 4 of the server 1 to the client machine 2 (FIG. 1).

More particularly, the retrieval of this context consists of obtaining, from the temporary storage unit 13:

the computational capacity C of the client machine 2,
the resolution of the screen of this machine, and
the bandwidth BP available on the communication network 3 for transmitting the video data.

Step E400 is followed by the step E401 which initializes the values of a table of values of dimension N, where N represents the number of transcoding methods defined in the set of transcoding methods. For each of the N transcoding methods, the following characteristics are stored: The format (CIF or QCIF) induced by the method, the percentage of the initial rate kept after the implementation of the transcoding method (90, 80 or 70%).

Furthermore, this step also initializes a table index variable n to the first value of the table equal to 1 (first transcoding method of the set of methods).

The following indexes are graduated up to N in steps of 1.

This step initializes to 0, on the one hand, a second variable Idopt which retrieves the identifier of the selected transcoding method and, on the other hand, a third variable maxPSNR.

Step E401 is followed by the step E402 which verifies whether the variable n is less than or equal to N.

If this is the case, the step E403 is proceeded to, which verifies whether the transcoding method in course of evaluation will generate a sequence whose format will be compatible with the screen of the client machine.

If the format is compatible, step E403 is followed by step E404 which evaluates the calculation complexity O of the process of decoding the transcoded video sequence.

To do this, for each image, there is retrieved the number of macroblocks encoded in Intra mode, $NMB_{intra}^{orig}$, and the number of macroblocks encoded in Inter mode, $NMB_{inter}^{orig}$ which make it up.

This information stored beforehand in unit 13 of FIG. 1, makes it possible to determine the decoding complexity of each image.

The decoding complexity of an image is given by the formula:

$$O_{Image} = NMB_{intra}^{orig} * O_{Intra} + NMB_{inter}^{orig} * O_{Inter}$$

The most complex image is searched for by going through all the images of the sequence.

An upper bound denoted O for the number of elementary operations per second necessary for the decoding of the sequence will be derived from the complexity of the most complex image which we will denote $O_{max}$ The upper bound denoted O will, for example, be calculated in the following manner:

$$O = O_{max} * F_t * \frac{NMB_{trans}}{NMB_{Ori}}$$

where $F_t$ is the frame rate induced by the transcoding method in course of evaluation (here, for example, 30 frames per second), $NMB_{trans}$ is the number of macroblocks per image in the transcoded sequence (396 for a sequence in CIF format, 99 for a sequence in QCIF format), and $NMB_{Ori}$ is the number of macroblocks per image in the original sequence (for example 396).

The estimation of the decoding complexity of a macroblock varies according to whether the macroblock is encoded in Intra or Inter mode.

As described below, the estimation of the decoding complexity of a macroblock will be detailed depending on whether the encoding took place in Intra mode or in Inter mode.

1) Encoding in Intra mode (Estimation of $O_{intra}$)

With the decoding taking place data block by data block, the decoding complexity of a macroblock is equal to the complexity related to the decoding of the four blocks which make it up.

More particularly, the decoding complexity of a block is determined by counting the number of elementary operations participating in the various algorithms used in the decoding process.

The values of the complexity related to the DCT decoding are supplied by the article "*Fast Algorithms for the Discrete Cosine Transform*", E. Feig and S. Winograd, *IEEE Trans. On Signal Proc.*, vol. 40, No. 9, September 1992.

Table 1 below details the determination of the decoding complexity of the different algorithms which participate in the decoding of a block using the different elementary operations.

TABLE 1

| processing | test | Multiplication | Addition | Allocation |
|---|---|---|---|---|
| VLD | | | | 64 |
| Inverse Q | 192 | 256 | | 192 |
| Saturation | 128 | | 64 | |
| Control | 2 | | 64 | 65 |
| Inverse DCT | | 94 | 454 | 64 |
| Total | 322 | 350 | 582 | 385 |

Preferentially, all these operations are considered to be elementary except the multiplication, which is considered to be equivalent to two elementary operations.

Thus the total decoding complexity of a macroblock (luminance components) encoded in Intra mode is 4*1989=7956 elementary operations.

2) Encoding in Inter Mode (Estimation of $O_{inter}$)

In the case where the macroblock is encoded in Inter mode, it is necessary to add, to the decoding complexity in Intra mode, the decoding complexity related on the one hand to the reconstruction of the movement vector from the differential movement vector which will be transmitted to the client machine 2 of FIG. 1 and on the other hand to the reconstruction of the macroblock (reconstruction of the difference macroblock and addition of this macroblock with the predicted macroblock).

The determination of the decoding complexity of these processes is detailed in Table 2 below which supplies, for each process, the number of elementary operations which participate.

TABLE 2

| Processing | test | multiplication | Addition | Allocation |
|---|---|---|---|---|
| VLD | | | | 2 |
| Reconstruction of movement vector | 7 | 5 | 13 | 11 |
| Reconstruction of difference macroblock | 1288 | 1400 | 2328 | 1540 |
| Construction of predicted macroblock | | | 512 | 256 |
| Reconstruction of macroblock | | | 256 | 256 |
| Total | 1295 | 1405 | 3109 | 2065 |

Thus, for the Inter or predictive mode, the total decoding complexity of a macroblock encoded in Inter mode is 9279 elementary operations.

Once the complexity of decoding O has been estimated as proposed above, step E404 is followed by a step E405.

During step E405, it is tested whether the complexity O estimated for decoding the video with the current encoding parameters is less than or equal to the calculation capacity of the client machine C.

If it is, this means that the transcoding method is compatible with the characteristic of the client machine.

Step E405 is then followed by the step E406 which tests the type of transcoding method in course of analysis.

If it is a method of the spatial resolution reduction type, step E406 is followed by the step E407 which proceeds with an estimation of the rate induced by the transcoding method based on a mathematical model for establishing the rate.

It will be seen later that the model is adapted to the transcoding method.

This last step is followed by the step E408 which verifies whether the estimated rate of the sequence r is less than or equal to the bandwidth of the communication network BP.

If this is the case, step E408 is followed by the step E411 which proceeds with an estimation of the visual quality induced by the transcoding method based on a mathematical model and taking into account the data to be transmitted.

If the result of the test carried out at step E408 is negative, then the step E414 is proceeded to, which increments the variable n by one unit, so making it possible to evaluate the following transcoding method.

If the transcoding method in course of analysis is of the rate reduction by quantization type, step E406 is followed by the step E409.

In this case, the rate r which the transcoding method must attain is known. Step E409 verifies whether the rate r is less than or equal to the bandwidth BP of the network.

If this is the case, the step E409 is followed by the step E410 which, based on a mathematical rate model, estimates the average quantization step size of the sequence after transcoding and stores this information in the unit 13.

It will be seen later that the model is adapted to the transcoding method.

If the result of the test carried out at step E409 is negative, then the step E414 already described is proceeded to.

Step E410 is followed by the step E411 during which the loss of quality between two video sequences is estimated by using, for example, the concept of PSNR ("Peak Signal to Noise Ratio") given by the following formula:

$$PSNR = 10\log_{10}\left\{\frac{(2^Y)^2}{1/N \sum_{i=1}^{N}(q_i - p_i)^2}\right\} \quad (1)$$

where $q_i$ designates a pixel of the decoded image, $p_i$ a pixel of the original image, N the number of pixels of the image and Y the dynamic of the original signal, corresponding in the present case to eight bits.

The PSNR supplies a quantitative measurement of the quality of the reconstructed image. It is determined from the ratio of the maximum amplitude of the signal to the root mean square error denoted RMSE and which is equal to $$1/N \sum_{i=1}^{N}(q_i - p_i)^2.$$

It should be noted that other methods of estimating a quality can of course be envisaged.

Step E411 is followed by the step E412 which compares the calculated PSNR to the value maxPSNR.

If the PSNR is greater than maxPSNR, the step E413 is proceeded to.

During this step, maxPSNR takes the value of PSNR and Idopt takes the value of the identifier of the current transcoding method.

Step E413 is followed by the step E414 which increments the value of n by one unit in order to proceed to the following transcoding method.

If the result of the test carried out at step E412 is negative, step E414 is proceeded to.

Note that the steps E403, E405, E408 and E409 are followed by the step E414 if, respectively, the format of the sequence is not compatible with the screen of the user, O is greater than C, and r is greater than BP.

When the result of the test carried out at step E402 is negative, this means that all the transcoding methods have been tested. Step E402 is in that case followed by the step E415 which verifies whether Idopt is equal to 0.

A value of 0 in Idopt means that no transcoding method is compatible with the characteristics of the client machine or of the network.

In this case step E415 is followed by the step E417 during which the server sends an error message to the client machine notifying it that it will not be able to receive the requested video. This message will be sent through the intermediary of unit 18 of FIG. 1 and ends the execution of the algorithm.

If, on the contrary, Idopt is different to 0, step E415 is followed by the step E416 which sends the encoding parameters to the encoding unit 11 which executes step E209 of FIG. 2.

These new parameters are, for example, a rate constraint and the format of the transcoded sequence. Note that, in the example embodiment described, the parameters transmitted correspond to the transcoding method compatible with the characteristics of the client machine and of the network and which maximize the visual quality.

It should be noted that steps E412 and E413 of the algorithm make it possible to select the transcoding method whose quality (e.g. PSNR) is the highest, as the different transcoding methods in the table are evaluated.

There will now be described in more detail, on the one hand, the adaptation of mathematical models for establishing the distortion and the rate to the transcoding methods and, on the other hand, the use of these adapted models in steps E407, E410 (rate model) and E411 (distortion model).

To do this, known models will be called upon and adapted, such as that described in the article entitled "*Normalized Rate-distortion Model for H.263-compatible Codecs and its Application to Quantizer selection*", by K. H. Yang, A. Jacquin, H. S. Jayant, proc ICIP97

More particularly, these models must be adapted in that they cannot predict the quality (distortion) and the rate of video data if their spatial resolution or frame rate has been modified.

In a first approach, the parametric model is adapted, for example to the MPEG-4 standard, which had been developed, in the article mentioned above, in the context of the encoding standard H-263+.

For a macroblock this model approximates the distortion-energy relationships of the signal represented by the video data with the following parametric function:

$$D(S) = \begin{cases} S & S < l \\ a \cdot \log(S - b)cS + d & l \le S < m \\ n & S \ge m \end{cases} \quad (2)$$

where D is the distortion, S is a measurement of the energy, and a, b, c, d, l, m and n are parameters of the distortion model. The variance of the macroblocks will, for example, be used as a measurement of energy.

In a similar manner, the rate-energy relationships for a macroblock are given by the following parametric function:

$$R(S) = \begin{cases} 0 & \text{if } S < l \\ \alpha \cdot \log(s) + \beta \cdot S + \gamma & \text{otherwise} \end{cases} \quad (3)$$

where R represents the rate and $\alpha$, $\beta$ and $\gamma$ are the parameters of the rate model.

The parameters l, m and n and $\alpha$, $\beta$ and $\gamma$ are obtained using a set of training sequences.

These sequences are test video data sequences which must form a sufficiently uniform set to represent approximately the extreme cases encountered in practice.

Thus, for example, among the training sequences are to be found sequences comprising little movement and others characterized by considerable movement, sequences with little texture, and others more textured, etc.

Figure 6:
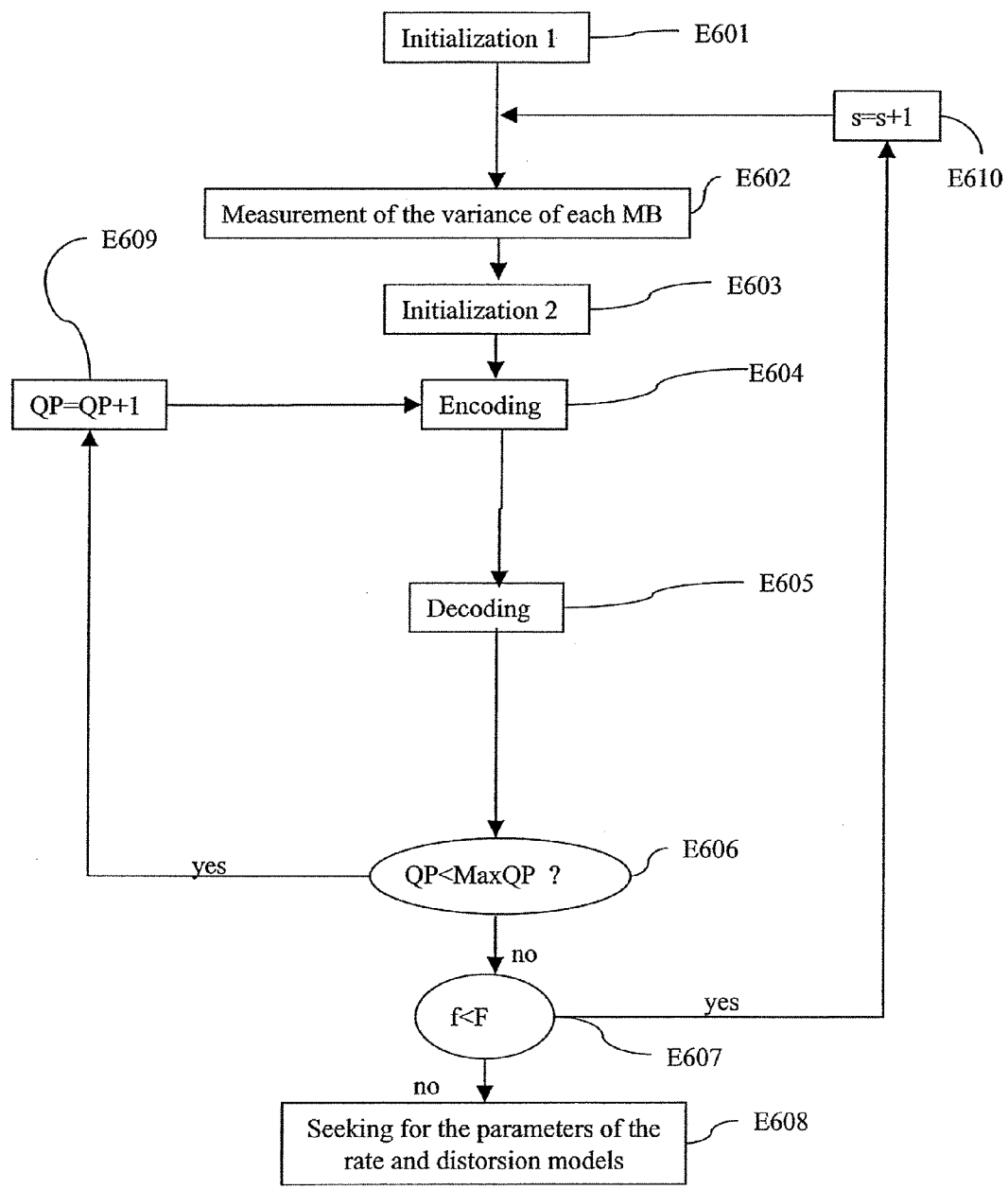
FIG. 6 shows an algorithm for determining the parameters of mathematical models for establishing a rate and a distortion.

To determine the parameters of the models defined by the formulae (2) and (3) stated above, a process based on an algorithm illustrated in FIG. 6 is implemented.

This algorithm will be executed based on a set of training sequences stored beforehand in YUV 4:2:0 format, for example, in the storage unit 13 of FIG. 1.

Each sequence, identified by a number from 1 to F, will be encoded at the time of the execution of this algorithm.

The algorithm commences at step E601 by the initialization of the variable f to 1. This variable represents the number of the sequence in course of analysis.

During step E601, a table is also initialized which will contain, for each macroblock of each sequence (identified by the number of the sequence, the number of the image which contains it and its position in that image), the variance of the macroblock, and, for each possible quantization parameter, the rate and distortion of the macroblock.

Step E601 is followed by step E602 during which the variance of each macroblock is measured and stored in the table referred to earlier.

Step E602 is followed by step E603 during which the variable QP, representing the quantization parameter attributed to all the macroblocks of the sequence at the time of encoding, is initialized to 1.

Step E603 is followed by step E604 during which the encoding of all the macroblocks of the sequence with the quantization parameter QP is carried out.

Step E604 is followed by the step E605 during which the decoding of the bitstream generated at step E604 is carried out. During the decoding, the decoding unit measures the rate and the distortion of each macroblock with respect to the original macroblocks.

This information is stored in the table referred to earlier.

Step E605 is followed by the step E606 during which it is verified whether the quantization parameter QP is less than the maximum quantization parameter MaxQP.

If it is the case, step E609 is proceeded to during which the quantization step size is incremented by 1.

If QP=MaxQP, step E607 is proceeded to during which it is verified whether the number of the current sequence f is less than the maximum sequence number F.

If it is the case, step E610 is proceeded to, during which the sequence number f is incremented by one unit to proceed to the following sequence.

If f=F the step E608 is proceeded to during which the parameters of the models concerned above are searched for.

The process concerned by step E608 consists of generating two sets of scatter plots representing, for each quantization step size, on the one hand, the distortion as a function of the variance, and, on the other hand, the rate as a function of the variance.

It should be noted that all the information necessary for the generation of the scatter plot is that which has been stored in the table concerned above.

Next, the curves D(S) and R(S) which best represent the scatter plots are sought.

Any method making it possible to find a curve best representing a scatter plot may be suitable.

In the description of the embodiment, a visual method will be used.

The coefficients a, b, c and d are obtained with the use of the following boundary conditions:

$$D(l)=l,\ D'(l)=1,\ D(m)=n,\ D'(m)=0$$

where D' represents the derivative of D with respect to S.

It should be noted that the distortion model and the rate model may each be represented by a single curve by normalizing the distortion, the rate and the variance with respect to the quantization step size QP.

To do this, in the formulae (2) and (3) concerned above, S, R and D are replaced by their respective normalized values $\hat{S}$, $\hat{R}$ and $\hat{D}$.

The relationship between S and $\hat{S}$ is given by:

$$\hat{S} = \frac{S}{(2QP)^2}$$

and the normalized distortion curve will be denoted $\hat{D}(\hat{S})$.

The relationships making it possible to retrieve the distortion and rate values for each QP from the normalized curves are given by the following formulae:

$$D(S,QP)=\hat{D}(\hat{S})*(2QP)^2$$

and $$R(S,QP)=R(\hat{S})$$

The normalization process could occur between steps E607 and E608 of the algorithm.

This process consists of generating, from the table referred to above, a second table which will contain the normalized variance, the normalized rate, and the normalized distortion for each macroblock.

Two scatter plots will be generated, one representing the rates normalized as a function of the normalized variance, the other representing the distortions normalized as a function of the normalized variance.

The search for the parameters of the models will then be made based on these two scatter plots.

Normalizing the distortion, the rate and the variance with respect to the quantization step size makes it possible to avoid having recourse to a model for each quantization step size and thus having to determine a set of parameters for each of these models.

It should be noted that this model does not make it possible to distinguish between the macroblocks according to their encoding mode, whereas it is known that, for example, macroblocks encoded in Intra mode and Inter mode have a very different behavior in particular in terms of rate.

An improvement of these models may therefore be obtained by determining a set of parameters specific to each mode of encoding envisaged.

Thus, in the example embodiment described, the algorithm of FIG. 6 will be iterated twice: a first time by only encoding the training sequences with the macroblocks encoded in Intra mode (to determine the parameters specific to Intra mode) and a second time by only encoding the training sequences with the macroblocks encoded in Inter mode (to determine the parameters specific to Inter mode).

According to a second approach, the models for establishing the distortion and the rate are adapted to the transcoding methods.

This adaptation may be carried out right at the start of steps E407 and E410 of the algorithm of FIG. 4 or else beforehand, outside of the execution of this algorithm.

This last solution makes it possible to reduce the execution time of the algorithm.

According to the type of the transcoding method determined at step E406 and according to the method which will be evaluated next during the execution of the following steps, there are two different manners of proceeding.

When the transcoding method is based on a reduction of the rate by re-quantization, the algorithm of FIG. 6 is executed in order to determine the specific parameters a, b, c, d, l m, n, α, β and γ of the rate and distortion models.

Nevertheless, in this case, the algorithm of FIG. 6 will comprise a supplementary decoding step inserted between steps E601 and E602 and after step E610, since the sequences of video data provided at the start of the algorithm will this time be encoded.

When the transcoding method is based on a reduction in the spatial resolution, the parameters of the rate model are determined in an identical manner to that described earlier.

The distortion model however requires greater adaptation.

This is because, in the case of the transformation from CIF format to QCIF format, the size of the images is divided by four. The generation of distortion-variance scatter plots with the use of training sequences for the estimation of the parameters of the distortion model, requires the comparison of the original training sequence and its encoded version.

Here the two sequences to compare have different resolutions.

It is thus necessary, for the comparison to be possible, to modify one of the two sequences to have the same resolution as the other.

In the example described, the encoded sequence is made to have the same resolution as the original sequence and each pixel plotted by the spatial position (x,y) of the encoded sequence will be repeated four times in the re-dimensioned sequence at the positions (2x,2y), (2x+1,2y), (2x,2y+1) and (2x+1,2y+1).

The root mean square errors are next calculated between the macroblocks of the original sequence and the macroblocks of the re-dimensioned encoded sequence.

It should be noted that this procedure makes it possible in particular to simulate the loss in quality due to the reduction in format.

This adaptation process enables distortion-variance scatter plots to be generated that are specific to the cases of spatial reduction.

The parameters of the distortion-variance curve corresponding to these scatter plots will be determined in an identical manner to that described earlier.

It should be noted that the processes of adaptation that have just been described are general insofar as they do not depend on the encoding mode.

To apply these processes to an encoding mode, it is appropriate to encode all the macroblocks of the training sequences according to this mode.

It will be noted that two specific models are thus obtained, one adapted to the reduction of the spatial resolution, the other adapted to the reduction of the rate by re-quantization.

Nevertheless, according to the degree of spatial reduction, the model will vary and it will be necessary to determine the new parameters adapted to that model.

On the other hand, as was seen previously, by virtue of the normalization of the distortion of the rate and of the variance with respect to the quantization step size, a single model adapted to the transcoding methods using a rate reduction by re-quantization may be used.

The adapted parameters of the model will thus not be modified.

We will now describe the use of the mathematical models for establishing the distortion and the rate to the different types of transcoding methods which is made during the execution of steps E407, E410 and E411 of the algorithm of FIG. 4 according to the invention.

Here, it will be noted that the models adapted to the transcoding methods will be applied to the video data of the sequence to be transmitted or, at the very least, to information that is representative of these data.

This will make it possible to evaluate the quality of the transcoding methods tested in a more effective manner than in the prior art where the quality of the transcoding methods is evaluated independently of the data to be transmitted.

Whatever the transcoding method analyzed, execution of steps E407, E410 and E411 starts with the extraction from the storage unit 13 of FIG. 1 of the variance information $\bar{s}$ and the number of macroblocks encoded in Intra mode $NMB_{intra}^{orig}$ and Inter mode $NMB_{inter}^{orig}$ of each image stored in the unit 13.

In the case of a transcoding method based on a reduction of the spatial resolution, a distortion and a rate will be calculated for each image.

The distortion of each image $D_I$ (in the form of a root mean square error or RMSE) will be given by the model represented by the formula (2) by introducing to it the average variance and the average quantization parameter of the image to be transcoded.

Note that this last item of information is extracted from the storage unit 13 of FIG. 1 where it had previously been stored.

The distortion of a macroblock encoded in Intra mode is given by:

$$\hat{D}_{intra}(\hat{s}) = \begin{cases} \hat{s} & \hat{s} < l_{1intra} \\ a_{1intra} \cdot \log(\hat{s} - b_{1intra}) + c_{1intra}\hat{s} + d_{1intra} & l_{1intra} \le \hat{s} < m_{1intra} \\ n_{1intra} & \hat{s} \ge m_{1intra} \end{cases}$$

Where $a_{1intra}$, $b_{1intra}$, $c_{1intra}$, $d_{1intra}$, $l_{1intra}$, $m_{1intra}$, and $n_{1intra}$ are the parameters of the model for the macroblocks encoded in Intra mode that are specific to the reduction in the spatial resolution and $$\hat{s}$$

is the normalized version of $\bar{s}$.

To determine the distortion $$\hat{D}_{inter}(\hat{s})$$

of the macroblocks encoded in Inter mode the parameters specific to Intra mode will be replaced by the parameters specific to Inter mode, i.e. $a_{1inter}$, $b_{1inter}$, $c_{1inter}$, $d_{1inter}$, $l_{1inter}$, $m_{1inter}$, and $n_{1inter}$.

In the example embodiment, the number $NMB_{intra}$ of macroblocks encoded in Intra mode and the number $NMB_{inter}$ of macroblocks encoded in Inter mode of an image of the transcoded sequence are obtained by the following formulae:

$$NMB_{intra} = \frac{NMB_{intra}^{orig}}{4}$$

$$NMB_{inter} = \frac{NMB_{inter}^{orig}}{4}$$

If $NMB_{intra}$ and $NMB_{inter}$ are not integers, then, for example, the value calculated for $NMB_{intra}$ will be replaced by the integer immediately above and the value calculated for $NMB_{inter}$ by the integer immediately below.

The distortion of each image is next derived using the formula:

$$D_I = \frac{NMB_{intra} * \hat{D}_{intra}(\hat{s}) * (2\bar{q})^2 + NMB_{inter} * \hat{D}_{inter}(\hat{s}) * (2\bar{q})^2}{NMB_{intra} + NMB_{inter}}$$

The PSNR of the image will be obtained by introducing the root mean square error RMSE $D_I$ into the formula (1).

Similarly, the rate of the image $R_I$ will be obtained using the mathematical model given by the formula (3):

$$R_m(\hat{s}) = \begin{cases} 0 & \text{if } \hat{s} < l_{1m} \\ \alpha_{1m} \cdot \log(\hat{s}) + \beta_{1m} \cdot \hat{s} + \gamma_{1m} & \text{otherwise} \end{cases}$$

Where $\alpha_{1m}$, $\beta_{1m}$ et $\gamma_{1m}$ are the parameters of the model for establishing the rate that are specific to the reduction of the spatial resolution, m being able to take the value "intra" or the value "inter".

The rate of the image is written as follows:

$$R_I = NMB_{inter} * R_{inter}(\hat{s}) + NMB_{intra} * R_{intra}(\hat{s})$$

In the example embodiment described, the distortion of the transcoded sequence will be obtained, for example, by calculating the average of the distortions of each image.

The rate of the sequence will be obtained, for example, by calculating the average of the rates of each image then by multiplying that average by the frame rate of the transcoded sequence (here 30 frames per second) in order to obtain a rate in bits/s.

In the case of a transcoding method based on a reduction in the rate by re-quantizing, the rate that must be attained by the transcoding method is known.

At step E410 of the algorithm of FIG. 4, the average rate of an image $\bar{R}_I$ is derived from that value by dividing it by the frame rate.

The average rate of a macroblock of the sequence $\bar{R}_{MB}$ is next obtained during that step by dividing $\bar{R}_I$ by NMB (which, here, is equal to 396). Still at step E410, knowing the average variance $\bar{s}$ of a macroblock of the image and the average rate $\bar{R}_{MB}$ of a macroblock of each image, the average quantization step size of each transcoded image $\tilde{q}$ will be derived by seeking the curve R(S,QP) that is the closest to the points ($\bar{s}$, $\bar{R}_{MB}$) in the rate-variance space.

To determine the distortion of each image, it then remains to introduce into the model of formula (2) the quantization parameter determined and the average variance of the image as shown below:

$$\hat{D}_m(\hat{\bar{s}}) = \begin{cases} \hat{\bar{s}} & \hat{\bar{s}} < l_{2m} \\ a_{2m} \cdot \log(\hat{\bar{s}} - b_{2m}) + c_{2m}\hat{\bar{s}} + d_{2m} & l_{2m} \leq \hat{\bar{s}} < m_{2m} \\ n_{2m} & \hat{\bar{s}} \geq m_{2m} \end{cases}$$

$$D_I = \frac{NMB_{intra} * \hat{D}(\hat{\bar{s}}) * (2\tilde{q})^2 + NMB_{inter} * \hat{D}(\hat{\bar{s}}) * (2\tilde{q})^2}{NMB_{intra} + NMB_{inter}}$$

where $a_{2m}$, $b_{2m}$, $c_{2m}$, $d_{2m}$, $l_{2m}$, $m_{2m}$, and $n_{2m}$ are the parameters of the model that are specific to the reduction of the rate by re-quantization, and m is able to take the values "intra" or "inter".

Here too the PSNR of the sequence will be obtained by introducing the root mean square error $D_I$ into the formula (1).

In the example embodiment, the distortion of the transcoded sequence will be obtained, for example, by calculating the average of the distortions of each image.

It is thus appropriate to note that the use of these rate/distortion models is a quick way of determining the PSNR (quality) and rate information necessary for the selection of an optimal transcoding method.

Figure 5:
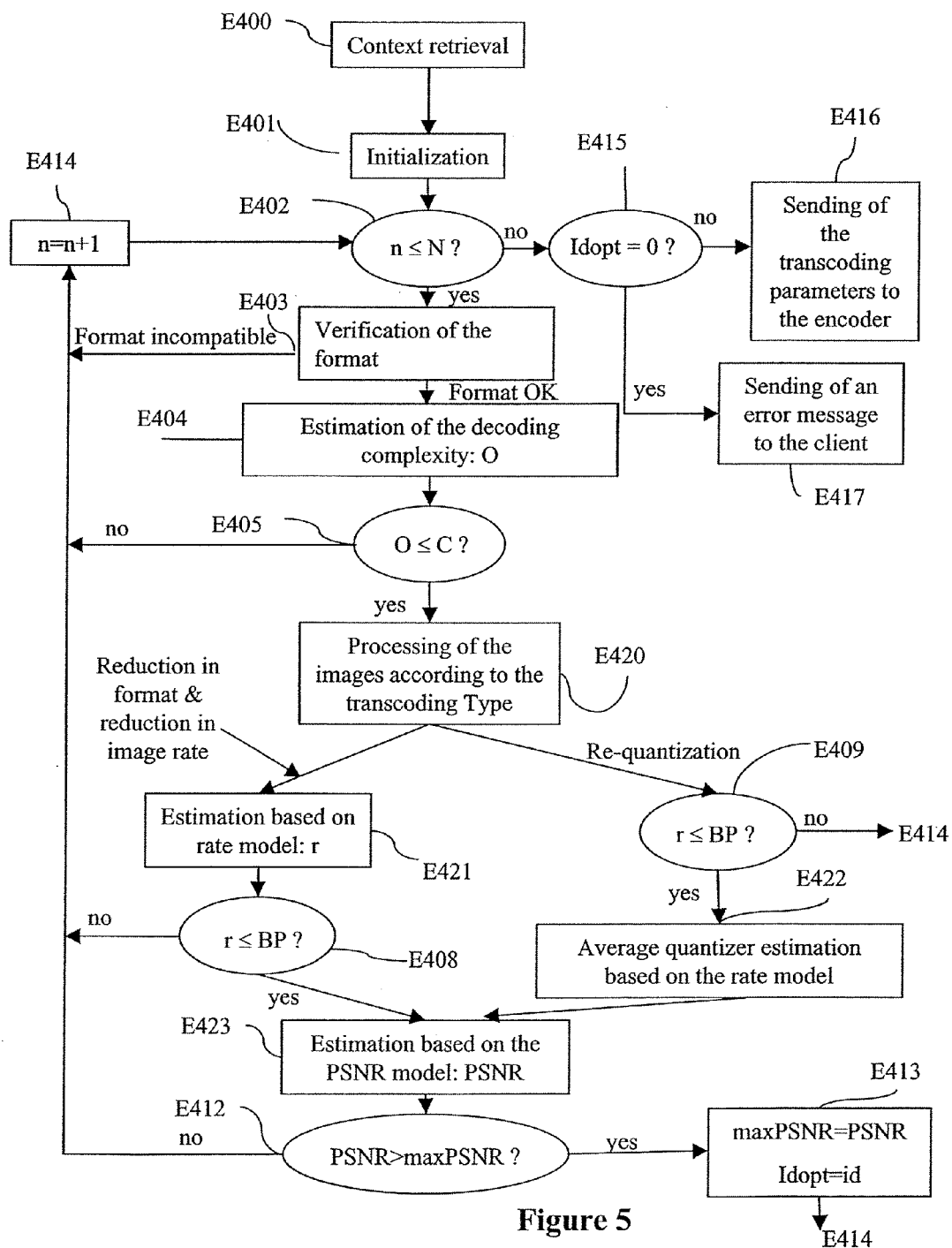
FIG. 5 shows a variant embodiment of the algorithm of FIG. 4.

According to a variant embodiment of the invention shown in FIG. 5, the rate and distortion models adapted to each transcoding method envisaged by a generic model adapted to the set of transcoding methods are replaced.

The algorithm of FIG. 5 is very similar to that of FIG. 4 in that steps E400 to E405, E408, E409 and E412 to E417 are the same as those having the same references in FIG. 4.

In the following description, only the modified steps will have different references.

It should be noted that in this variant of the invention, it is no longer useful to calculate and store in the storage unit 13 of FIG. 1 the variance of each macroblock at step E204 of FIG. 2 (decoding).

However, the sequence of data to be transmitted and which is stored in unit 13 in YUV format will be used to determine, at step E406, different information according to the transcoding method evaluated.

The distinction between the transcoding methods will thus no longer be made in relation to the models used, but rather in relation to the processing of the data from the images before their use by the single model.

Thus the model comprises, after step E405, a step E420 of processing the video data to be transmitted to the client machine which is adapted to the transcoding method of which the quality is evaluated.

This processing may also apply to information representing digital data.

Three transcoding methods have been envisaged in FIG. 5: (a) reduction of the CIF format to QCIF format, (b) reduction of the image rate from 30 to 10 frames per second, (c) re-quantization to reduce the rate by 10%.

For the first transcoding method (a), it is known that a block of the transcoded sequence will represent a macroblock (4 blocks) of the original sequence.

It is thus necessary to simulate the loss in quality due to the spatial reduction and, to achieve this, the variance of a macroblock will be used.

Nevertheless, the variance calculation will not be carried out over all 16*16 pixels of the macroblock.

In fact, the variance will be calculated over 8*8 pixels by taking only one pixel out of every two in each line of pixels and one pixel out of every two in each column of pixels.

For the second transcoding method, (b), it will be necessary to take into account the reduction in the frequency of the images.

The result of this transcoding is that, in the transcoded sequence, one image is kept out of every three of the original sequence.

In the example embodiment of the invention, if Ni is the number of images in the original sequence, for each image of order t (t varying from 1 to Ni−3), the difference between that image and the image of order t+3 is calculated.

Next, for example, the variance is calculated of each macroblock of each of the Ni−3 difference images obtained.

For the third transcoding method (c), the case is simpler, since all that is required, in the example described, is to calculate the variance of each macroblock of each image of the original sequence.

This variance information obtained at step E420 is next stored in the storage unit 13 of FIG. 1.

Whatever the transcoding method used, in the example embodiment of the invention, steps E421, E422 and E423 begin with the extraction from the storage unit 13 of the variance information $\bar{s}$ and the number of macroblocks encoded in Intra mode $NMB_{intra}^{orig}$ and Inter mode $NMB_{inter}^{orig}$ of each image stored in the unit 13.

In the case of a transcoding method based on a reduction of the spatial resolution or on a reduction of the frame rate, a value for distortion and for rate will be calculated for each image.

The distortion of each image $D_I$ will be obtained by the model represented by formula (2) by introducing into it the average variance and the average quantization parameter of the image to be transcoded.

The distortion of a macroblock encoded in Intra mode is given by the following model:

$$\hat{D}_{intra}(\hat{\bar{s}}) = \begin{cases} \hat{\bar{s}} & \hat{\bar{s}} < l_{intra} \\ a_{intra} \cdot \log(\hat{\bar{s}} - b_{intra}) + c_{intra}\hat{\bar{s}} + d_{intra} & l_{intra} \leq \hat{\bar{s}} < m_{intra} \\ n_{intra} & \hat{\bar{s}} \geq m_{intra} \end{cases}$$

where $a_{intra}$, $b_{intra}$, $c_{intra}$, $d_{intra}$, $l_{intra}$, $m_{intra}$, $n_{intra}$ are the parameters of the model for the macroblocks encoded in Intra mode and $$\hat{\bar{s}}$$

is the normalized version of $\bar{s}$.

To determine the distortion $$\hat{D}_{inter}(\hat{\bar{s}}),$$

of the macroblocks encoded in Inter mode the parameters specific to Intra mode will be replaced by the parameters specific to Inter mode, i.e. $a_{inter}$, $b_{inter}$, $c_{inter}$, $d_{inter}$, $l_{inter}$, $m_{inter}$, $n_{inter}$.

According to the example embodiment described, the number $NMB_{intra}$ of macroblocks encoded in Intra mode and the number $NMB_{inter}$ of macroblocks encoded in Inter mode of an image of the transcoded sequence are obtained by the following formulae:

$$NMB_{intra} = \frac{NMB_{intra}^{orig}}{K},$$

$$NMB_{inter} = \frac{NMB_{inter}^{orig}}{K},$$

where K is the ratio between the format of the original sequence and the format of the transcoded sequence (K=1 or 4).

If $NMB_{intra}$ and $NMB_{inter}$ are not integers, then, for example, the value calculated for $NMB_{intra}$ will be replaced by the integer immediately above and the value calculated for $NMB_{inter}$ by the integer immediately below.

The distortion of each image is next derived using the formula:

$$D_I = \frac{NMB_{intra} * \hat{D}_{intra}(\hat{s}) * (2\bar{q})^2 + NMB_{inter} * \hat{D}_{inter}(\hat{s}) * (2\bar{q})^2}{NMB_{intra} + NMB_{inter}}$$

The PSNR of the image will be obtained by introducing the root mean square error $D_I$ into the formula (1).

Similarly, the rate of the image $R_I$ will be obtained using the mathematical model given by the formula (3)

$$R_m(\hat{s}) = \begin{cases} 0 & \text{if } \hat{s} < l_{1m} \\ \alpha_m \cdot \log(\hat{s}) + \beta_m \cdot \hat{s} + \gamma_m & \text{otherwise} \end{cases}$$

where $\alpha_m$, $\beta_m$ et $\gamma_m$ are parameters of the model and where m may take the value "intra" or the value "inter".

The rate of the image is written as follows:

$$R_I = NMB_{inter} * R_{inter}(\hat{s}) + NMB_{intra} * R_{intra}(\hat{s})$$

In the example embodiment described, the distortion of the transcoded sequence will be obtained, for example, by calculating the average of the distortions of each image.

The rate of the sequence will be obtained, for example, by calculating the average of the rates of each image then by multiplying that average by the frame rate of the transcoded sequence (here 30 or 10 frames per second) in order to obtain a rate in bits/s.

In the case of a transcoding method based on a reduction of the rate by re-quantization, the algorithm is identical to that described above with reference to FIG. 4.

Here, nevertheless, the parameters $a_m$, $b_m$, $c_m$, $d_m$, $l_m$, $m_m$, $n_m$ are the same as those used above for the spatial reduction or the reduction of the frame rate.

With reference to FIG. 7, an example of a programmable apparatus implementing the invention is described. This apparatus is adapted to process multimedia digital data with a view to transmitting them.

According to the chosen embodiment shown in FIG. 7, an apparatus implementing the invention is for example a microcomputer 700 or a workstation connected to different peripherals, for example a digital moving image camera 701 (or a scanner, or any means of acquiring or storing an image) connected to a graphics card and supplying to the apparatus data to be adapted and transmitted.

The apparatus 700 comprises a communication bus 702 to which there are connected:

a central processing unit 703 (microprocessor), which fulfills the function of the control unit 19 of FIG. 1, a read only memory 704, able to contain the program "Progr", a random access memory 706, containing registers 707 adapted to record variables created and modified during the execution of the program referred to above and in particular the variables r, BP, O, C, PSNR, MaxPSNR, Idopt, Id, n and N mentioned with reference to the previous figures, a screen 708 for displaying the data to be processed and/or serving as a graphical interface with the user, who will be able to interact with the program according to the invention, using a keyboard 710 or any other means such as a pointing device, not shown, such as for example a mouse or light pen, a hard disk 712 able to contain the aforementioned program "Progr", a disk drive 714 adapted to receive a diskette 716 and to read or write thereon data processed or to be processed according to the invention, a communication interface 718 connected to a communication network 720, for example the Internet, the interface being able to transmit and receive data.

In the case of audio data, the apparatus also comprises an input/output card connected to a microphone, neither of which is shown.

The communication bus allows communication and interoperability between the different elements included in the microcomputer 700 or connected to it. The representation of the bus is non-limiting and, in particular, the central processing unit is able to communicate instructions to any element of the microcomputer 700 directly or by means of another element of the microcomputer 700.

The executable code of the program denoted "Progr" enabling the programmable apparatus to implement the methods of retrieving the context (FIG. 2), encoding/decoding (FIGS. 3a and 3b) and the method of selection of a method of transcoding the data (FIGS. 4 and 5) according to the invention, can be stored for example on the hard disk 712 or in read only memory 704 as shown in FIG. 7.

Although only one program is identified, it is possible to have several programs or subprograms for implementing the invention.

According to a variant, the diskette 716 can contain compressed and stored data as well as the executable code of the program or programs according to the invention which, once read by the apparatus 700, will be stored in the hard disk 712.

As a second variant, the executable code of the program or programs can be received by means of the communication network 720, via the interface 718, in order to be stored in an identical fashion to that described previously.

The diskettes can be replaced by any information carrier such as a compact disc (CD-ROM) or a memory card. Generally, an information storage means, which can be read by a computer or microprocessor, integrated or not into the device, and which may possibly be removable, is adapted to store a program whose execution permits the implementation of the method according to the invention In more general terms, the program can be loaded into one of the storage means of the apparatus 700 before being executed.

The central processing unit 703 will control and direct the execution of the instructions or portions of software code of the program or programs according to the invention, instructions which are stored on the hard disk 712 or the read only memory 704 or in the other aforementioned storage elements.

On powering up, the program or programs which are stored in a non-volatile memory, for example the hard disk 712 or the read only memory 704, are transferred into the random access memory 706, which will then contain the executable code of the program or programs according to the invention, as well as registers for storing the variables necessary for implementation of the invention.

It should be noted that the data processing apparatus comprising a device according to the invention can also be a programmed apparatus.

This apparatus then contains the code of the computer program or programs for example fixed in an application specific integrated circuit (ASIC).

It should be noted that the apparatus in FIG. 7 which contains the program "Progr" previously mentioned may, in the context of a communication architecture of the client-server type, be the device 4 in FIG. 1.

The invention claimed is:

1. A method for selecting a method from a set of methods of transcoding digital video data, the data being transferable between at least two communication apparatuses via a communication network,
    wherein the set of transcoding methods includes at least two different types of transcoding methods, each type of transcoding method being selected from at least one of a plurality of methods of reducing a spatial resolution by subsampling images of a video sequence by deleting pixels in lines or columns of images of the video sequence, a plurality of re-quantization methods and a plurality of methods of reducing a frame rate,
    said selection method comprising the following steps:
    for each transcoding method, obtaining a distortion value from a mathematical model for establishing the distortion taking into account at least said type of transcoding method, the distortion model establishing a relationship between the distortion and the energy of the signal represented by the digital data to be transcoded; and
    selecting a transcoding method as a function of the different distortion values obtained for the set of transcoding methods.

2. The selection method according to claim 1, further comprising the following steps:
    for each transcoding method, obtaining a rate value from a mathematical model for establishing the rate taking into account said transcoding method, the rate model being applied to information representing digital data; and
    selecting a transcoding method according to:
    (1) the different rate values, and
    (2) the different distortion values obtained for the set of transcoding methods.

3. The selection method according to claim 2, wherein the rate model establishes a relationship between the rate and the energy of the signal represented by the digital data.

4. The selection method according to claim 3, wherein the rate model has the following form:

$$R(S) = \begin{cases} 0, & \text{if } S < 1 \\ a\log(S) + \beta S + \gamma & \text{otherwise,} \end{cases}$$

wherein R represents the rate, S is a measurement of the energy, and a, b, g, and l are parameters of the rate model which vary as a function of the transcoding method.

5. The selection method according to claim 1, further comprising:
    prior to said obtaining step, a step of adapting the model to each transcoding method.

6. The selection method according to claim 1, further comprising:
    prior to said obtaining step, a step of processing the digital data in a manner adapted to each transcoding method.

7. The selection method according to claim 6, wherein the adapted processing is applied to information representing digital data.

8. The selection method according to claim 1, further comprising a step of:
    testing the compatibility of each transcoding method with at least one constraint associated with at least one of the communication apparatuses and/or with the network.

9. The selection method according to claim 8, wherein a constraint corresponds to the authorized rate over the communication network.

10. The selection method according to claim 8, wherein a constraint corresponds to one or more characteristics of one of the communication apparatuses which is intended to receive the digital data.

11. The selection method according to claim 1, wherein the distortion model has the form:

$$D(S) = \begin{cases} S, & \text{if } S < 1 \\ a\log(S-b) + cS + d, & \text{if } 1 \le S < m \\ n, & \text{if } S \ge m \end{cases}$$

wherein D represents the distortion, S is a measurement of the energy, and a, b, c, d, l, m and n are parameters of the distortion model which vary as a function of the transcoding method.

12. A device for selecting a method from a set of methods of transcoding video data, the data being transferrable between at least two communication apparatuses via a communication network,
    wherein the set of transcoding methods includes at least two different types of transcoding methods, each type of transcoding method being selected from at least one of a plurality of methods of reducing a spatial resolution by subsampling images of a video sequence by deleting pixels in lines or columns of images of the video sequence, a plurality of re-quantization methods and a plurality of methods of reducing a frame rate,
    the device comprising:
    means for obtaining a distortion value, for each transcoding method, from a mathematical model for establishing the distortion taking into account at least said type of transcoding method, the distortion model establishing a relationship between the distortion and the energy of the signal represented by the digital data to be transcoded; and
    means for selecting a transcoding method according to the different distortion values obtained for the set of transcoding methods.

13. The device according to claim 12, further comprising:
    for each transcoding method, means for obtaining a rate value from a mathematical model for establishing the rate taking into account said transcoding method, the rate model being applied to information representing digital data; and means for selecting a transcoding method according to:
(1) the different rate values, and
(2) the different distortion values obtained for the set of transcoding methods.

14. The device according to claim 13, wherein the rate model establishes a relationship between the rate and the energy of the signal represented by the digital data.

15. The device according to claim 14, wherein the rate model has the following form:

$$R(S) = \begin{cases} 0, & \text{if } S < 1 \\ a\log(S) + \beta S + \gamma & \text{otherwise,} \end{cases}$$

wherein R represents the rate, S is a measurement of the energy, and a, b, g, and l are parameters of the rate model which vary as a function of the transcoding method.

16. The device according to claim 12, further comprising: means for adapting the model to each transcoding method.

17. The device according to claim 16, wherein the adapted processing is applied to information representing digital data.

18. The device according to claim 12, further comprising: means for processing the digital data in a manner adapted to each transcoding method.

19. The device according to claim 12, further comprising: means of testing the compatibility of each transcoding method with at least one constraint associated with at least one of the communication apparatuses and/or with the network.

20. The device according to claim 19, wherein a constraint corresponds to the authorized rate over the communication network.

21. The device according to claim 19, wherein a constraint corresponds to one or more characteristics of one of the communication apparatuses which is intended to receive the digital data.

22. The device according to claim 12, wherein the distortion model has the following form:

$$D(S) = \begin{cases} S, & \text{if } S < 1 \\ a\log(S - b) + cS + d, & \text{if } 1 \leq S < m \\ n, & \text{if } S \geq m \end{cases}$$

wherein D represents the distortion, S is a measurement of the energy, and a, b, c, d, l, m and n are parameters of the distortion model which vary as a function of the transcoding method.

* * * * *